US006928314B1

(12) United States Patent (10) Patent No.: US 6,928,314 B1
Johnson et al. (45) Date of Patent: Aug. 9, 2005

(54) SYSTEM FOR TWO-DIMENSIONAL AND THREE-DIMENSIONAL IMAGING OF TUBULAR STRUCTURES IN THE HUMAN BODY

(75) Inventors: Charles D. Johnson, Rochester, MN (US); Judd E. Reed, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 09/355,075

(22) PCT Filed: Jan. 23, 1998

(86) PCT No.: PCT/US98/01504

§ 371 (c)(1),
(2), (4) Date: Aug. 11, 2000

(87) PCT Pub. No.: WO98/32371

PCT Pub. Date: Jul. 30, 1998

(51) Int. Cl.[7] .............................................. A61B 5/05
(52) U.S. Cl. .................... 600/407; 128/920; 382/128
(58) Field of Search .............................. 600/407, 416; 128/920, 922; 382/128, 294; 378/20; 345/419

(56) References Cited

U.S. PATENT DOCUMENTS

| 4,630,203 A | 12/1986 | Szirtes ....................... 364/414 |
| 4,939,646 A | 7/1990 | Essinger et al. ....... 364/413.22 |
| 5,170,170 A | 12/1992 | Soumekh .................... 342/179 |
| 5,178,150 A | 1/1993 | Silverstein et al. .... 128/662.06 |
| 5,323,111 A | 6/1994 | Suzuki ....................... 324/309 |
| 5,361,763 A | 11/1994 | Kao et al. ................ 128/653.2 |
| 5,368,033 A | 11/1994 | Moshfeghi ............... 128/653.4 |
| 5,458,111 A | 10/1995 | Coin .......................... 128/747 |
| 5,574,763 A | 11/1996 | Dehner ........................ 378/17 |
| 5,662,113 A | 9/1997 | Liu ....................... 128/660.07 |
| 5,699,799 A | 12/1997 | Xu et al. ................. 128/653.1 |
| 5,782,762 A | 7/1998 | Vining ........................ 600/407 |
| 5,859,891 A | 1/1999 | Hibbard ...................... 378/62 |
| 5,891,030 A | 4/1999 | Johnson et al. ............ 600/407 |
| 5,920,319 A | 7/1999 | Vining et al. ............... 345/420 |

(Continued)

FOREIGN PATENT DOCUMENTS

WO WO 97/30736 8/1997

OTHER PUBLICATIONS

Fenlon, H. M. et al. "Colorectal neoplasm detection using virtual colonoscopy: A feasibility study" Gut 1998; 43: 806-811.*

(Continued)

*Primary Examiner*—Shawna J. Shaw
(74) *Attorney, Agent, or Firm*—Faegre & Benson LLP

(57) ABSTRACT

This invention is a system, method, and article of manufacture for imaging tubular structures of the human body, such as the digestive tract of a living person, with a medical imaging device such as a computed tomography (CT) scanner and a computer work station. The system comprises receiving a first image data set representative of a portion of the colon in a prone position and a second image data set representative of a portion of the colon in a supine position, at a series of viewpoints. At each of the viewpoints, an image is generated of the colon in the prone and supine positions. The prone and supine images of the colon are simultaneously displayed on a screen display in a dual view mode.

37 Claims, 18 Drawing Sheets

U.S. PATENT DOCUMENTS

| | | | |
|---|---|---|---|
| 5,971,767 A | 10/1999 | Kaufman et al. | 434/267 |
| 6,083,162 A | 7/2000 | Vining | 600/407 |
| 6,369,812 B1 * | 4/2002 | Iyriboz et al. | 345/419 |

OTHER PUBLICATIONS

Johnson C. D., et al. "Computed Tomographic Colonography (Virtual Colonoscopy): A New Method for Detecting Colorectal Neoplasms" Endoscopy 1997; 29: 454-461.*

Dachman, et al., "Small Simulated Polyps in Pig Colon: Sensitivity of CT Virtual Colography,"*Radiology*, v. 203, pp. 427-430, May 1997.

Erickson, "Colonic Gold: Simulated flights through patients' bowels may one day permit widespread screening without scoping,"*Physicians Weekly*, Jun. 26, 1995.

GE Medical Systems, "Advantage Windows: Diagnostic Workstation" (brochure), Jan. 27, 1997.

Haney, "Simpler Colon Test Reported, X-rays, computers are linked for inside view without tube,"*The Plain Dealer*, p. 8-A, Mar. 28, 1995.

Hara, et al., "Reducing Data Size and Radiation Dose of CT Colonography,"*American Journal of Radiology*, v. 168, pp. 1181-1184, May 1997.

Hara, et al. "Colorectal Polyp Detection With CT Colography: Two- versus Three-dimensional Techniques, "*Radiology*, v. 200, No. 1, pp. 49-54, Jul. 1996.

Hara, et al. "Detection of Colorectal Polyps by Computed Tomographic Colography: Feasiblity of a Novel Technique, "*Gastroenterology*, v. 110, pp. 284-290, 1996.

Ogura, et al., Three-Dimensional CT Colonoscopy: Comparison with Colonoscopy and Barium Enema Examination, Scientific Exhibits, Radiology of North America, Nov. 1995.

Reed, et al., "Interpretation of Image Sets Containing Convoluted Tubular Structures Via Transluminal Sections and Steerable Intraluminal Perspective Views", Proceedings of International Society for Optical Engineering, v 710, pp. 1109-1019, Feb. 1996.

Riotto, "Virtual Reality Provides a Closer Look at Colon, "*Radiology Today*, p. 11, Jul. 1994.

Rubin, et al., "Perspective Volume Rendering of CT and MR Images: Applications for Endoscopic Imaging", *Radiology*, v. 199, pp. 321-329, 1996.

Vining, et al., "Update on Virtual Colonoscopy"*The Society of Gastrointestinal Radiologists*, Twenty-Fifth Annual Meeting and Postgraduate Course, Mar. 24-29, 1996.

Vining, et al., "Principles of Virtual Reality Imaging," Scientific Exhibits, Radiology Society of North America, Nov. 1995.

Vining, et al., "Noninvasive Colonscopy Using Helical CT Scanning, 3D Reconstruction, and Virtual Reality,"*Society of Radiologists*, Feb. 1994.

Vining, et al., "Experience with Virtual Colonoscopy in 20 Patients," Scientific Exhibits, Radiology Society of North America, Nov. 1995.

Vining, et al., "Virtual Colonoscopy,"*Radiology Society of North America* (RSNA), v. 193, p. 446, 1994.

Vining, et al., "CT Cytoscopy: An Innovation in Bladder Imaging,"*American Journal of Radiology*, v. 166, pp. 409-410, Aug. 2, 1995.

Woodhouse, et al. "In Vitro Air-Contrast-enhanced Spiral 3D CT (Virtual Colonoscopy) Appearance of Colonic Lesions," Scientific Exhibits, Radiology Society of North America, Nov. 1995.

Wang et al. "GI Tract Unraveling by Spiral CT," SPIE, vol. 2434, pp. 307-315, Jan. 27, 1997.

Zeiberg, et al., "Helical (Spiral) CT of the Upper Airway with Three-Dimensional Imaging: Technique and Clinical Assessment,"*American Roentgen Ray Society*, v. 166, pp. 293-299, Feb. 1996.

Reed, et al., "CT Colography Combines Virtual Colonoscopy and Transluminal Cross Sections", Computer Assisted Radiology Proceedings of the International Symposium, Jun. 1996 (Jan. 1996), pp. 171-176.

Lorensen, et al., "The Exploration of Cross-Sectional Data With a Virtual Endoscope", Interactive Technology and the New Paradigm for Healthcare; Jan. 19, 1995, pp. 221-230.

Reed, et al., "Interpretation of Image Sets Containing Convoluted Tubular Structures Via Transluminal Sections and Steerable Intraluminal Perspective Views", Medical Imaging 1996 Image Processing; Newport Beach, Ca, United States, Feb. 12-15, 1996, vol. 2710, 1996, pp. 1009-1019, Feb. 1996.

* cited by examiner

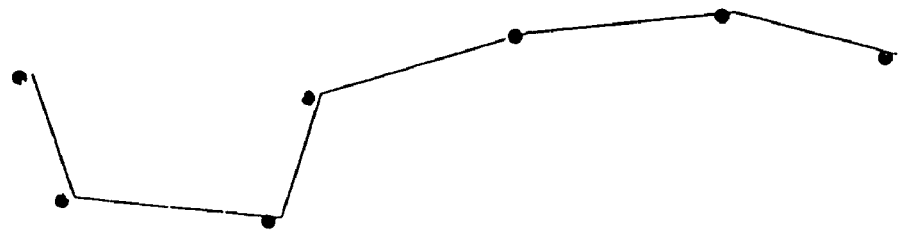
(a)
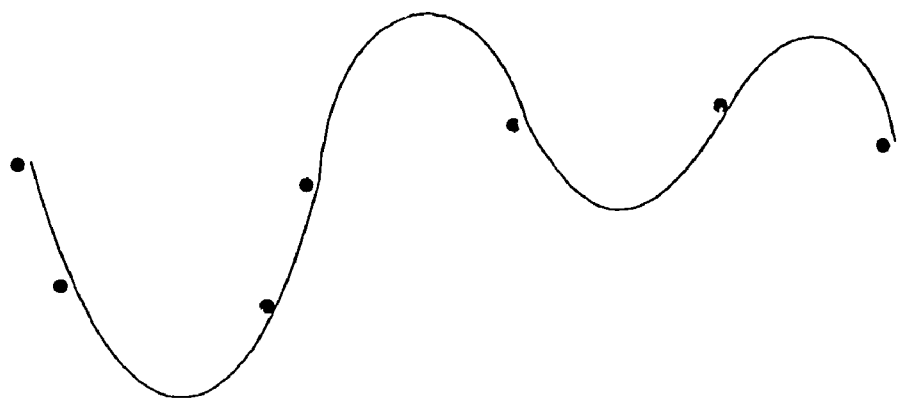
(b)
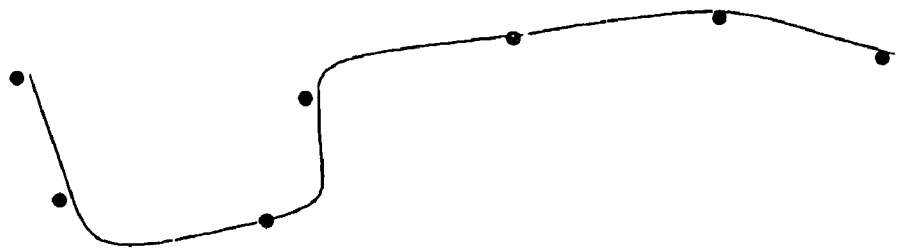
(c)
FIG. 7

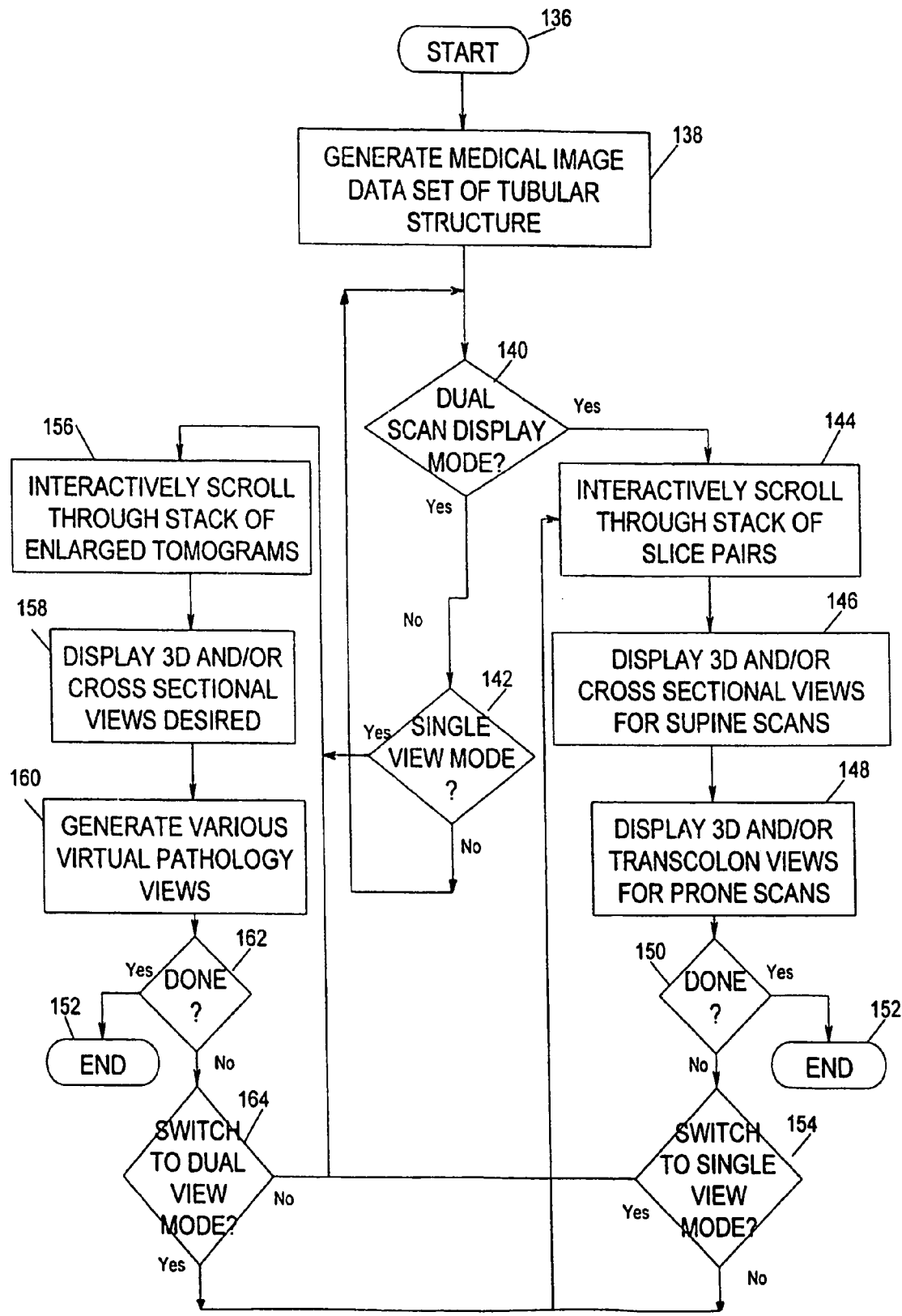

SYSTEM FOR TWO-DIMENSIONAL AND THREE-DIMENSIONAL IMAGING OF TUBULAR STRUCTURES IN THE HUMAN BODY

FIELD OF THE INVENTION

The present invention generally relates to anatomical modeling of the human body with a computer, and more particularly to a computerized system for analyzing tubular structures of the human body such as the digestive tract of a living person for detecting colorectal polyps.

BACKGROUND OF THE INVENTION

In industrialized nations, colorectal cancer is the second leading cause of deaths from malignancy. In the United States, almost 150,000 people are found to have colon cancer annually and it causes approximately 60,000 deaths annually. Only lung cancer causes more deaths. Colon cancers are preventable because they usually begin as benign polyps which grow slowly for five to ten years before becoming cancerous. If these polyps are detected and removed, the risk of developing colon cancer is greatly reduced.

Unfortunately, widespread colorectal screening and preventive efforts are hampered by several practical impediments, including limited resources, methodologic inadequacies, and poor patient acceptance leading to poor compliance. In addition, a fecal occult blood test (FOBT) fails to detect the majority of cancers and pre cancerous polyps. Since sigmoidoscopy only examines a portion of the colon, it also misses many polyps. The accuracy of barium enema varies among centers and is therefore not always reliable.

Therefore, there is a need for a new test which can be used to screen for pre cancerous colon polyps. Like all screening tests, this new test must be relatively inexpensive, minimally invasive, and highly specific.

A technique using helical computed tomography (CT) to create computer simulated intraluminal fights through the colon was proposed as a novel approach for detecting colorectal neoplasms by Vining D J, Shifrin R Y, Grishaw E K, Liu K, Gelfand D W, *Virtual colonscopy (Abst)*, Radiology Scientific Prgm 1994; 193(P):446. This technique was first described by Vining et al. in an earlier abstract by Vining D J, Gelfand D W, *Noninvasive colonoscopy using helical CT scanning, 3D reconstruction, and virtual reality (Abst)*, SGR Scientific Program, 1994. This technique, referred to as "virtual colonoscopy", requires a cleansed colon insufflated with air, a helical CT scan of approximately 30 seconds, and specialized three-dimensional (3D) imaging software to extract and display the mucosal surface. The resulting endoluminal images generated by the CT scan are displayed to a medical practitioner for diagnostic purposes.

The technique of reformatting 2D cross sections perpendicular to the colon midline is also described in U.S. Pat. No. 5,458,111, issued Oct. 17, 1995 to Coin. However, direct interpretation of the cross-sectional images is difficult because a scan of the colon consists of several hundred axial tomograms. Without advanced image manipulation tools, interpretation of the colon's complex three dimensional shape from these cross sections alone is very difficult for a medical practitioner.

One approach to improve accuracy involves production of reformatted 2D images at cross sections and orthogonal angles to the colon midline. These reformatted 2D images can provide complimentary diagnostic information when viewed with corresponding intraluminal 3D images. Exam efficiency can be improved with innovative 3D rendering techniques that allow fast, interactive evaluation on low priced computer hardware.

Retained fluid in the lumen of a colon is also a commonly encountered problem that can obscure lesions. Prone imaging in addition to standard supine imaging is often required to visualize obscured colonic segments. Although the colorectum is often seen optimally with combined supine and prone views, twice as much interpretation is required with both acquisitions.

Furthermore, the current CTC utilizes an interactive combination of axial, reformatted 2D and 3D images (from an endoluminal perspective) that are generated in real time. Navigating the colorectum within this "Virtual Endoscopy" (VE) metaphor is tedious. To alleviate this problem and free the radiologist to concentrate on diagnosis, a two-pass approach has been adopted. In the first pass, the colon is semiautomatically navigated and its midline is recorded. Then in a second pass, the radiologist moves the view point (virtual endoscope tip) along this midline. This second pass takes from several minutes per scan.

To reduce interpretation time of Computed Tomographic Colography (CTC), additional volume rendered displays have been developed which show longer segments of the colon in formats analogous to views which may be seen at autopsy. These include a technique called "Planar Virtual Pathology" (PVP) which uses image planes of the two longitudinal transcolonic sections as cut planes within isometric volume rendered images. Scenes are rendered with rays passing orthogonally through these planes from both sides. Each of the four resulting images depicts approximately one-half of the inner surface of a 12 cm bowel segment. Interpretation is performed by viewing these colon segments at approximately 8 cm intervals. In this way, the entire colon can be rapidly examined with a minimum of navigational input from a user such as a radiologist.

Other virtual pathology views have also been developed. These include Cylindrical Virtual Pathology (CVP) and Mercator Virtual Pathology (MVP). CVP views are formed by casting rays perpendicular to a straight line which approximates a segment of the colon midline. These views are analogous to the result of splitting a segment of excised colon and opening it to expose its inner surface. Interpretation can be performed interactively or by viewing a series of pre-computed CVP views as described for PVP above. With MVP, views are generated by casting rays from a single viewpoint in all directions. The resulting view is a panoramic image. Interpretation of CVP is performed interactively in a manner similar to that of VE.

In resolving the above problem, volume rendered endoluminal perspective views of the colon have been explored. However, available workstations were not fast enough to do the required rendering interactively. One of the methods of addressing this challenge is to render six images at each point along the colon midline. These images are aligned with the image coordinates and each has a ninety degree field of view. Virtual Endoscopy (VE) views with arbitrary camera orientation and view field can be derived from these images in real time using simple image warp and merge operations. These panoramic scene sequences make it possible to visualize the entire endoluminal surface without further manual navigation.

Additional panoramic projections have been developed. They are volume rendered scenes. However, they are quite different from other perspective volume renderings. In conventional perspective rendering techniques, pixel coordinates map the angle (or the tangent thereof) between the cast ray and the central axis of scene. The range of angles (field of view) is usually limited to around +/−45 degrees. The present invention produces images where these angles range from +/−90 degrees in the y-axis (latitude) and 0 to 360 degrees in x-axis (longitude). The result is a panoramic endoluminal view similar to a mercator projection map. This is called Mercator Virtual Pathology (MVP). Another technique provided by the present invention is to map angles of view from 0 to 360 degrees along the x-axis but to move the point of view for each row in the image. This forms a cylindrical projection. This is called Cylindrical Virtual Pathology (CVP). The advantage of each of these techniques of the present invention is that it shows larger regions of the colon in each rendered scene than previous virtual colonographic images. They also simplify navigation by eliminating two or three of the degrees of freedom.

Therefore, there is a need for techniques which provide efficient and accurate evaluation of the colon using helical CT data. There is a need for displaying coronal, sagittal, and axial views of the colon. There is also a need for displaying a three dimensional image of the colon. There is a further need for displaying an unfolded or open view of the colon.

Yet there is a need to further reduce interpretation time of the Computed Tomographic Colography. There is also a need for an improved display mode which enables a user to interpret long segments of the colon at one time and to reduce interpretation time for Computed Tomographic Colography.

SUMMARY OF THE INVENTION

The present invention provides a system, method, and article of manufacture for imaging tubular structures of the human body, such as the digestive tract of a living person, with a medical imaging device such as a computed tomography (CT) scanner and a computer workstation. The CT scanner is used to generate cross-sectional axial images of a human colon which are then transferred to the computer workstation. A colon midline is defined which follows the colon lumen. The computer workstation supports colon midline definition by generating and displaying reformatted cross-sectional images, volume rendered scouts, and interluminal views. Semi-automatic midline defining tools are also included. After the midline is defined, a montage of images is displayed for diagnostic purposes. The images include axial sections, transluminal cross section, and intraluminal volume rendered images.

Semiautomatic methods are used to delineate the three dimensional shape of the colon by identifying its approximate midline. This is supported by the display of coronal, sagittal, and axial views as well as an off-axis plane orthogonal to the midline. Straightened curved sections along the midline and a rendered view from the end of the midline are also displayed. Editing the midline in any of these views causes the other views to update accordingly. After the midline is traced, data are extracted so the colon can be examined efficiently.

A medical practitioner, such as a radiologist, examines the colon by moving the view point along the delineated midline. Three orthogonal off-axis cross sections, volume rendered extraluminal scouts or the raw axial 2D images, and a high resolution perspective rendering of the colon's inner surface are all displayed. The perspective views can be re-oriented in any direction. A rotatable longitudinal sectioning along the colon's midline is also displayed. This view, showing the entire length of the colon, enhances both navigation of the path forward or backward along the 3D images and interpretation of the 3D images.

Empirical research shows that the simultaneous display of cross-sectional and rendered views enhances a diagnostic interpretation more than either cross-sectional or intraluminal views alone. Volume rendering is performed by custom algorithms that use pre-computation of texture and other techniques to achieve interactive performance on moderately priced workstations. These greatly reduce the number of computations required to generate a ray traced image, which makes volume rendering possible with computational requirements similar to those of surface rendering.

Two views of the three dimensional images are displayed to the observer. The first view is a forward intraluminal view which encompasses a view of the colon from the view point looking away from a terminating location of the colon, such as the anal verge. The second view is a backward intraluminal view which encompasses a view of the colon from the view point looking toward a terminating location of the colon, such as the anal verge. Displaying both views makes it less likely that a feature of interest will be obscured due to the topology of the colon.

By pointing the cursor and simultaneously pressing a key, an observer can move the view point off the previously defined midline, and all images, including 2D reformatted images, 3D intraluminal images, and the 2D axial image are updated to views corresponding to the designated position. A fiducial mark on each of the images identifies the new position. The observer can randomly move the view point by using the pointing device, or return to the nearest point on the predetermined midline.

To denote orientation and location, two extraluminal renderings of the air-filled colon are displayed in axial and coronal orientations to assist the observer in determining location and orientation.

To assist in the diagnosis, an unfolded or opened view of the colon is also displayed to the observer. The opened view of the colon corresponds to a view of the entire colon as if it had been physically divided and opened for inspection.

The present invention also provides an alternative method, system, and article of manufacture for reduction in interpretation time of scanned image data involved in the production of reformatted 2D images at cross sections and orthogonal, etc. One of the ways is to display synchronously both prone and supine scanned images of the colon. This approach enhances the ability of Computed Tomographic Colography (CTC) that combines with advantages of prone and supine views without the added interpretation times of reviewing two separate scans. Simultaneous display of synchronized (anatomically registered) views of the colon eliminates the need for two separate readings of the colon and shortens interpretation time. In one embodiment of the present invention, the anatomic levels are indexed to match each other and are advanced synchronously as a radiologist interprets the data set. Axial, reformatted 2D and 3D images are displayed and simultaneously updated for both prone and supine images on the same computer screen. The colon only needs to be reviewed once, with the diagnostic benefit of both supine and prone scans. In many cases, the two scans can be interpreted nearly as quickly as one scan.

Accordingly, the present invention is also a computed tomographic colography (CTC) system having such improved interpretation tools which provide synchronously interactive montage of images. The present system displays several distinct types of images. These include volume rendered endoluminal perspective (virtual colonoscopic views), transcolonic sections, navigational scout images showing the entire colon, and "mathematically unraveled" views of the colon. The region of the screen where the scouts and small axial, sagittal, and coronal views are normally displayed can alternatively be used to present a single enlarged axial section. The present system can also include a virtual pathology software which displays rendered images of a large colon segments in order to greatly reduce interpretation time.

Therefore, as opposed to viewing the scan results through tracing along a midline of the colon to find a desired position, the alternative method of the present invention allows a user (such as a radiologist) to freely view a desired position of a subject any time without following a scan sequence tracing along the midline of the colon. Furthermore, because of the ability of freely viewing a desired position of a subject and the ability of displaying dual scanned images of the subject simultaneously according to the corresponding indexes established during the dual scanning, a clearer image of the subject at the desired position is shown by comparing the two views (supine and prone) and selectively enlarging the better view of the two views. Accordingly, this approach not only significantly reduces the interpretation time by cutting down the pre-processing of the scanned data tracing along the midline, but also largely increases the quality of the image.

The present invention also provides a viable colon screening tool wherein the perspective volume rendering approach (dubbed virtual colonoscopy) is augmented by alternate rendering scheme called "Virtual Pathology (VP)" to facilitate a faster, global viewing approach. The present invention provides CTC reading approaches which are based on this new metaphor. It will be appreciated that a person skilled in the art would recognize that a method of interpreting CTC will be altered as these new type of rendered images continue to grow in acceptance and improve in speed and image quality.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIGS. 7a through 7c show the splining of a hypothetical midline by various algorithms.

FIG. 18 is a flow diagram illustrating a method for imaging a human body with a medical imaging device providing synchronous interpretation of supine and prone computed tomographic colography.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Glossary

The following terms and phrases are used throughout the application.

1. Computed tomographic colonography (CTC). A technique combining helical or volumetric CT imaging of the colon with imaging software to produce reformatted 2D and 3D images of the colon.
2. Reformatted 2D images. Images which are oriented at cross section and two orthogonal angles to the colon midline.
3. 3D intraluminal image. An image which simulates an endoscopic view of the colon. The outside of the colon is not visualized.
4. 2D axial image. The original image produced by the helical or volumetric CT scanner before any image post-processing is performed.
5. Straightened colon/continuous orthogonal image. Images which are oriented at a cross section in the volume image of the straightened colon which correspond to a convoluted ribbon bisecting the colon along its axis.
6. 3D extraluminal images. Images which represent as 3D extraluminal rendering of the entire colon in axial, sagittal and coronal orientations.
7. Raw 2D images. Transaxial non-reformatted images generated by the CT scanner.

DETAILED DESCRIPTION

For the purpose of illustrating the best mode of practicing the present invention, this description describes the process of analyzing the colon of a living human patient. It will be recognized that the present invention can enhance the assessment of any tubular structure of the human body where intraluminal and transluminal views are desirable. By way of example, the present invention has been used to evaluate the trachea and bronchial tree, the bowel, and other vascular structures such as the aorta. One of ordinary skill in the art will recognize that other organs and structures of the human body in addition to those listed above, such as the heart, stomach, or bladder, may be analyzed with the present invention without loss of generality.

Figure 1:
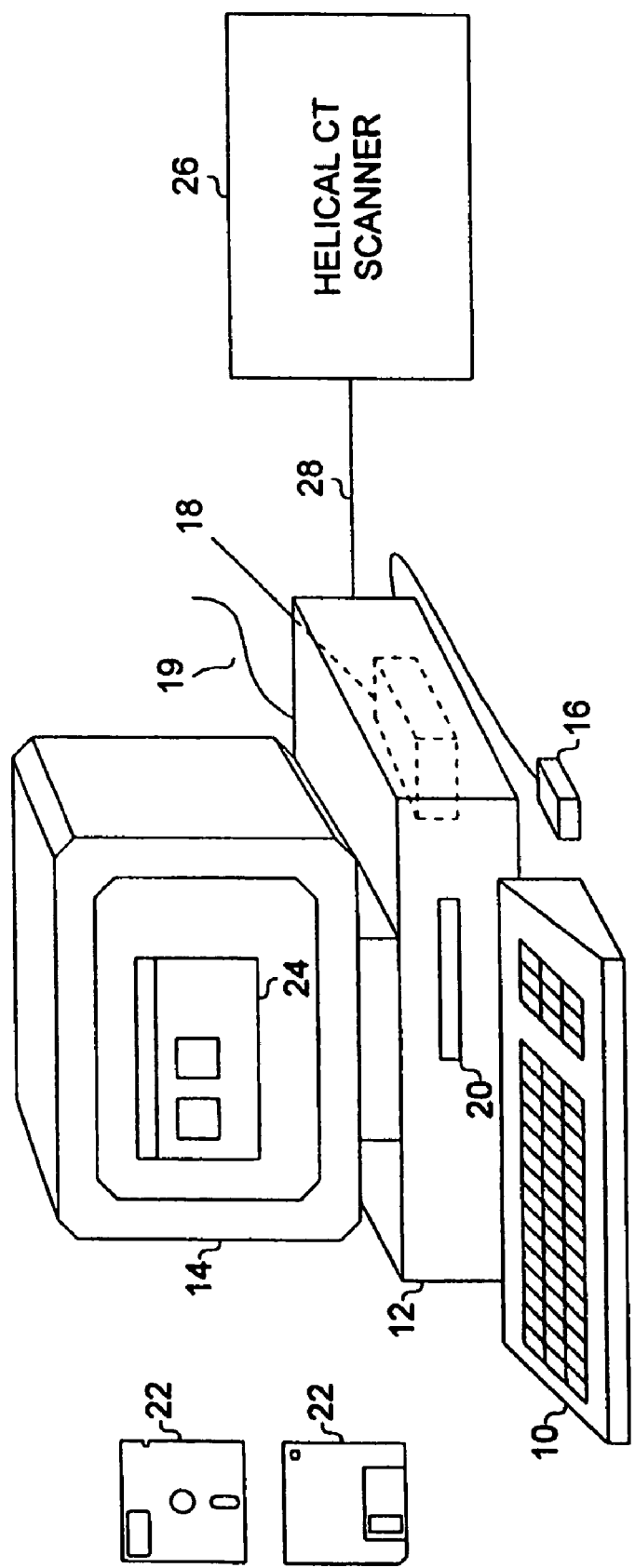
FIG. 1 is a perspective view of the components of a system for imaging a human body with a medical imaging device compatible with the present invention.

FIG. 1 shows the components of a preferred medical imaging system that may be used with the present invention. The system includes a workstation typically having a keyboard 10 by which a user may input data into the system, a computer chassis 12 which holds electrical processing components and a memory 18. The computer 12 also contains a removable storage device 20 by which removable media 22, typically floppy disks, magnetic tapes, or removable fixed disks, may be used to provide information to the computer 12. The computer 12 could also be coupled to other I/O devices, including a local area network (LAN) or wide area network (WAN) via interface cable 19. The system further contains a screen display 14 by which information 24 is displayed to the user, and a pointing device 16, typically a mouse. The computer components are logically connected to each other via internal system bus within the computer, which is further connected to a helical or volumetric CT scanner 26 via an external data bus 28. The present invention includes a preprogrammed set of instructions which are stored in the memory 18 and processed by one or more processing units within the computer 12.

Figure 2:
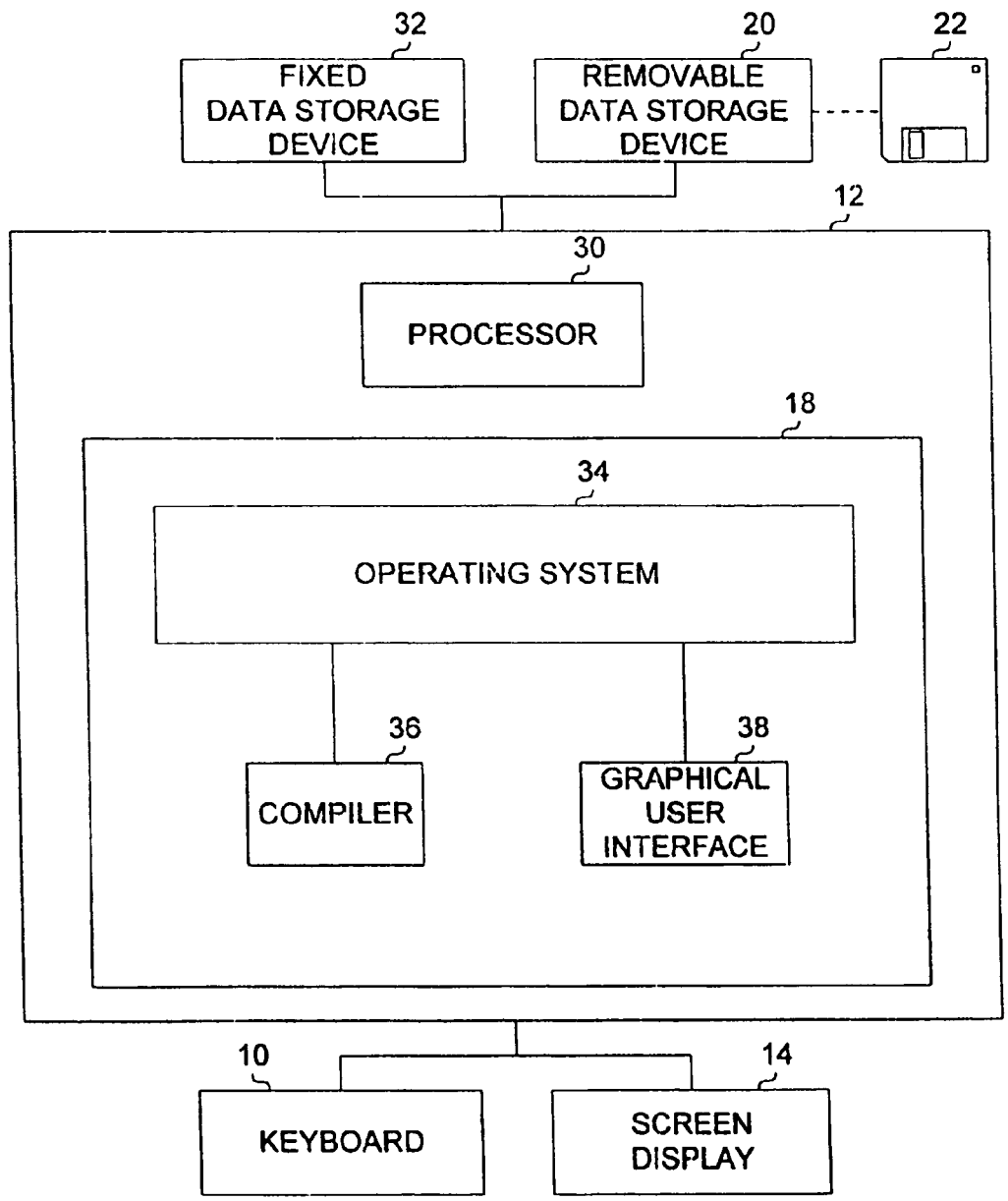
FIG. 2 is a block diagram illustrating an exemplary hardware environment used to implement a preferred embodiment of the invention.

FIG. 2 is a block diagram illustrating an exemplary hardware environment used to implement the preferred embodiment of the invention. In the exemplary hardware and software environment, the computer 12 may include, inter alia, a processor 30, memory 18, keyboard 10, screen display 14, as well as fixed and/or removable data storage devices and their associated media 20, 22, and 32. Those skilled in the art will recognize that any combination of the above components, or any number of different components, peripherals, and other devices, may be used with the computer 12.

The present invention is generally implemented using a compiler program, and a linker program, each of which executes under the control of an operating system 34, such as OS/2, Windows, AIX, UNIX, DOS, etc. For purposes of simplification, the compiler program and linker program will be collectively referred to herein as a compiler 36. Those skilled in the art will recognize that the compiler 36 can conform to many programming language conventions without departing from the scope of the present invention. A graphical user interface (GUI) 38 executes under the control the operating system 34 to provide text and graphics information on the screen display 14.

Those skilled in the art will recognize many modifications may be made to this configuration without departing from the scope of the present invention.

Computed tomography colonography (CTC) typically uses a helical computed tomography scanner to obtain contiguous axial cross sections of the lower abdomen. It will be recognized that other imaging technologies may be used instead of helical computed tomography, such as electron beam CT, magnetic resonance imaging (MRI), positron emission tomography (PET), or soft x-rays or high-resolution ultrasound. Because of the nature of CT data, typically seventy five to five hundred images are produced for a single series. The present invention provides an efficient way to handle the large number of images, reduce the amount of time required for diagnosis, and improve the reliability of the interpretation.

A preferred method of performing a CTC examination involves four sub-processes: 1) preparation of the colon, 2) scanning the colon, 3) identification of the colon midline, and 4) support of diagnostic interpretation by a radiologist. Dividing analysis steps into separate sub-processes is a significant departure from the paradigm of most medical imaging workstations. Current workstations, like most personal computer and workstation packages, typically are based upon a "toolbox" metaphor. The operator of these systems, like a craftsman in a work shop or an artist in a studio, has access to all of the tools and raw materials required to construct a finished product, which is in this case a medical diagnosis. The choice of tools and the order of their use are controlled by the operator. Given enough time, a skilled artist can construct a wide variety of finished products. However, the artist is not optimally efficient and would typically find it difficult to produce several identical products.

In contrast, the present invention provides for the users of CTC systems to operate in a manner similar to assembly line workers. Each receives intermediate results from a previous subsystem, performs a limited number of well-defined tasks, has access to the tools appropriate for the performance of these tasks, and passes the partially finished product on to the next stage in a well-defined state of completeness. Just as assembly lines are more efficient than craftsman, systems based upon the present invention's "pipeline" metaphor are often more efficient than those based upon the "toolbox" metaphor. Additionally, the present invention insures that the same processing steps are performed on each image data set, making it much more appropriate for scientific applications.

Figure 3:
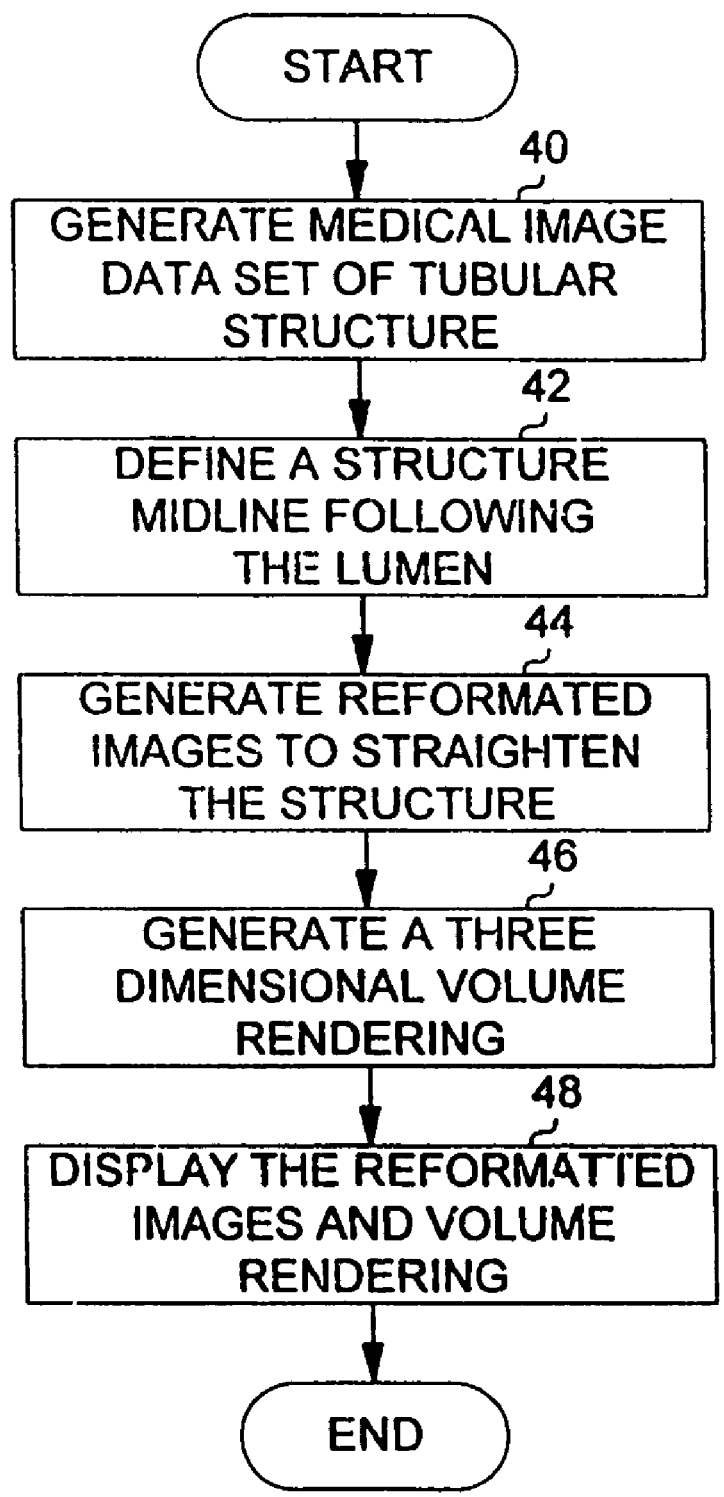
FIG. 3 is a flow diagram illustrating a method for imaging a human body with a medical imaging device compatible with the present invention.

FIG. 3 is a flow diagram illustrating a method for imaging a human body with a medical imaging device compatible with the present invention. At block 40, the medical imaging device 26 is used to generate an image data set of the structure within the human body. At block 42, the image data set is used to assist in defining a midline following the structure lumen. The midline may be manually defined, or semiautomatic tools may assist the user in creating the midline. At block 44, the computer 12 uses the image data set to automatically generate two dimensional reformatted images of the structure centered on the structure midline. At block 46, the computer 12 automatically generates a three dimensional intraluminal image of the structure. At block 48, the two dimensional reformatted images and the three dimensional intraluminal image of the structure are dynamically simultaneously displayed to the user on the display device 14.

Processing

As described above, the preferred method of performing a CTC examination can be divided into four sub-processes: 1) preparation of the colon, 2) scanning the colon, 3) identification of the colon midline, and 4) support of diagnostic interpretation by a radiologist. The first two sub-processes are generally known within the prior art, but are briefly described below because they are significant to understanding the subsequent steps. The remaining two sub-processes are described in detail below.

Process 1: Preparation of the Colon

Initially, the present invention provides for colon preparation equivalent to that of traditional colonoscopy including fasting and the oral administration of laxatives. The patient's colon is insufflated with air. It will be recognized that other colon preparations may be used with the present invention, such as insufflating the colon with a gas other than air, filling the colon with a liquid contrast medium, using an oral stool marker in either the prepped or unprepped colon, or eliminating insufflation or filling of the colon altogether. It will also be recognized that a modification of the colon preparation procedure should be accompanied by corresponding modifications to the image analysis steps described below, because the modification will likely change the appearance of the colon's inner surface in the medical images.

Process 2: Scanning the Colon

Scanning is preferably performed on a fast helical CT scanner. As noted above, other medical imaging technologies may be substituted for a fast helical CT scanner without loss of generality. This technology requires a volumetric data set that covers the entire structure. Although a variety of scanning protocols are used, a typical collimation of five millimeters (mm) and a typical pitch of 1–2 is used. If a table speed of five mm per second is used, ten centimeters can be scanned in a 20 second breath hold. Since the colon spans a thirty to fifty centimeter region of the lower abdomen, three or four breath holds are required. Results produced by the present invention will improve as the technological improvement of CT scanners provides for machines which are capable of scanning the entire colon in a single breath hold. A reconstruction interval of one to three mm is often used.

Process 3: Identification of the Colon Midline

Following the scanning step described above, the reconstructed images are transferred to a computer workstation for identification of the colon. The midline, or midline, of the colon is delineated through the use of special purpose three dimensional tracing software. This software contains a full complement of manual and semiautomatic tools. Since the purpose of this subsystem is only to map the colon midline, optimal quality images are not necessary. Therefore, the scan is subsampled to the resolution of the workstation used as the display device. A preferred voxel volume of approximately eight cubic mm and a preferred contrast resolution of eight data bits is used with one embodiment of the present invention, although it will be recognized that the voxel volume and contract resolution may each be substantially increased or decreased without loss of generality. By using the preferred voxel volume and contrast resolution, the amount of data which must be processed is typically reduced by approximately a factor of sixteen.

Figure 4:
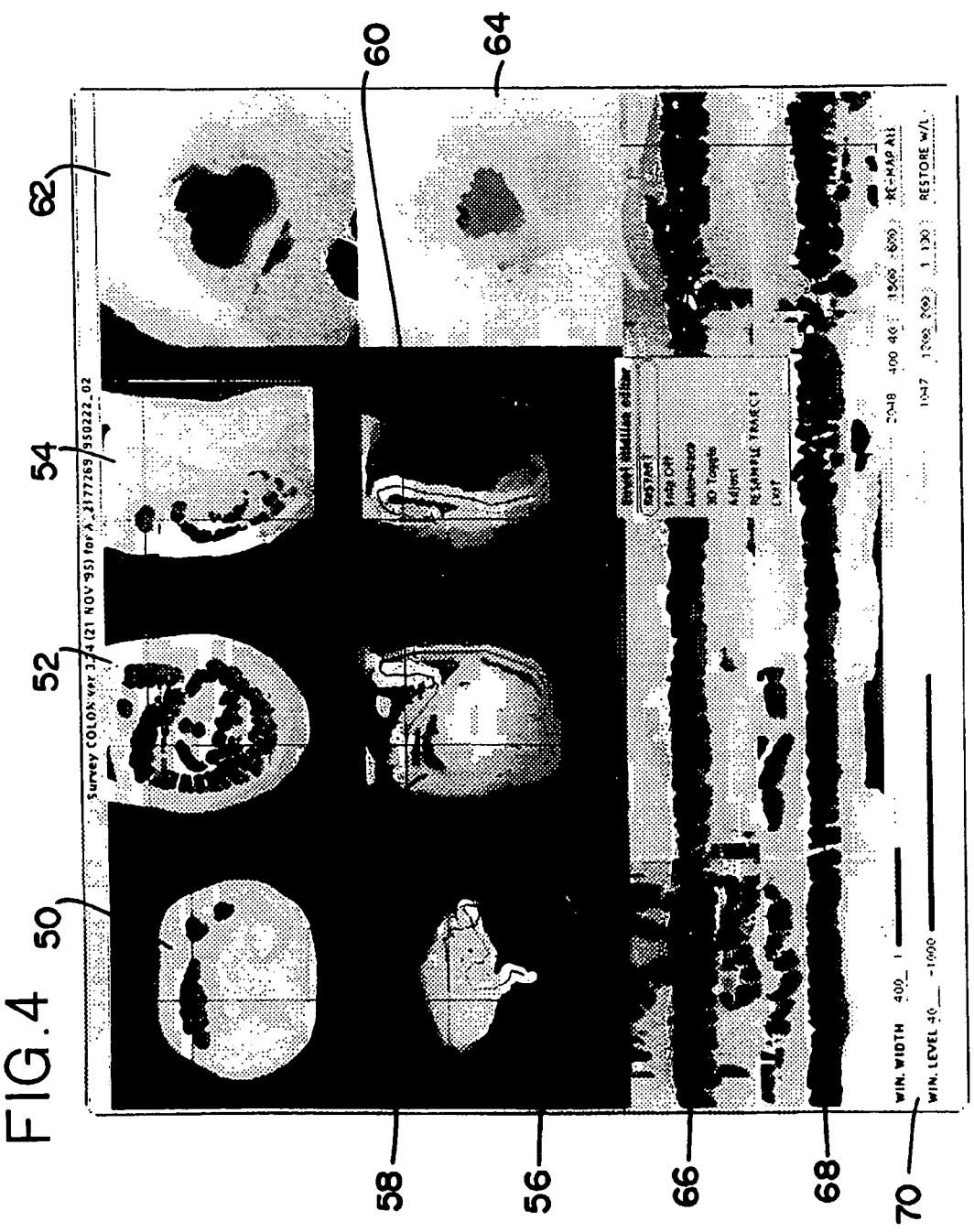
FIG. 4 is a screen display of a midline tracing tool used for semi-automatic tracing of a colon midline compatible with the present invention.

The computer workstation preferably displays images in a montage of views, including axial, coronal, and sagittal cross sections and corresponding rendered scout views, as shown in FIG. 4. Fiducial marks shown within each of the displayed views provide three dimensional localization. As the three dimensional course of the colon is delineated, the colon midline is preferably superimposed over the scout views and intersections with cross sections are displayed. Extension of the delineated midline or movement of the cursor in any image causes corresponding changes in the other images.

Figure 8:
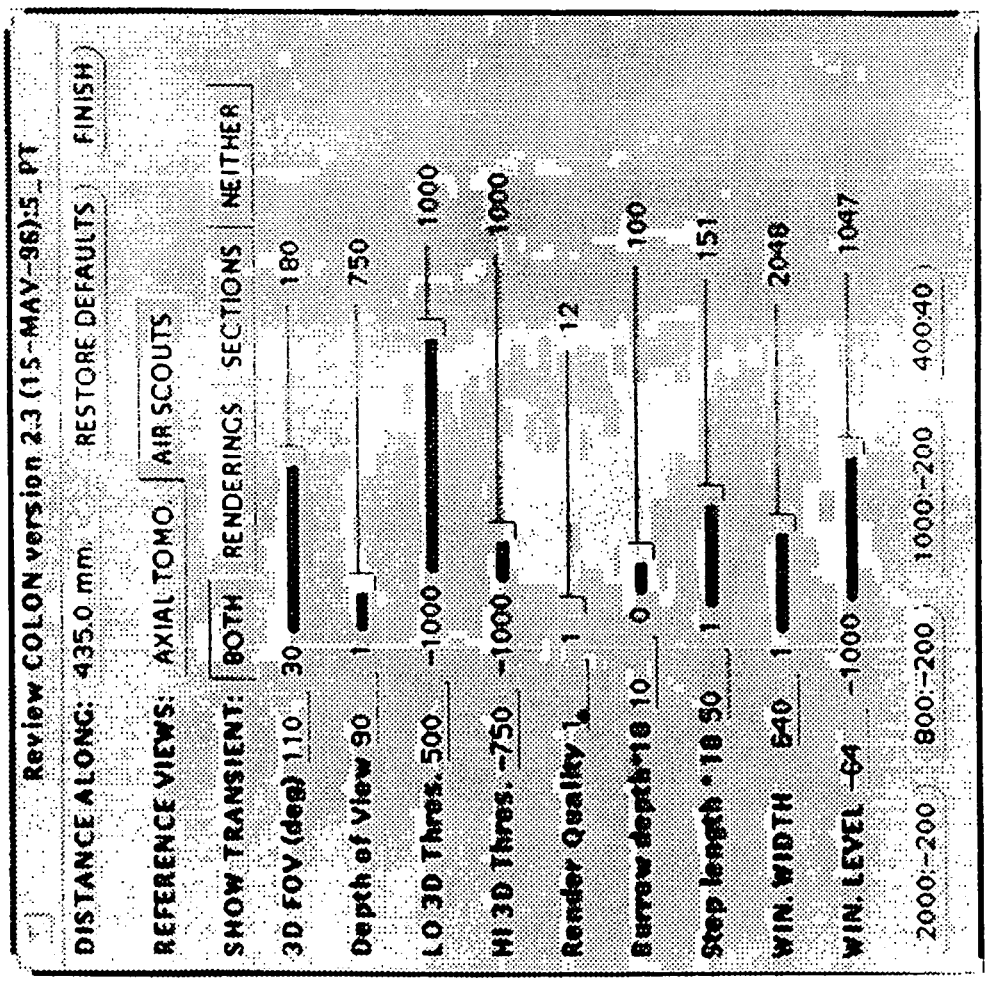
FIG. 8 is a screen display of a parameter adjustment window compatible with the present invention.

FIG. 4 illustrates a workstation display showing a preferred software interface of the present invention. The first three images on the upper row are axial 50, coronal 52, and sagittal 54 cross sections, respectively. Corresponding rendered scouts axial 56, coronal 58, and sagittal 60, are shown just below each of these views. The image 62 in the upper right portion of the display is an enlarged off axis cross section centered over the end of a delineated midline. Below this image is a low resolution rendered view 64 looking further into the colon. The elongated pictures at the bottom of the display 66, 68 are images of the straightened colon showing the entire length of the delineated colon. At the bottom of the display, a graphical user interface (GUI) control panel 70 allows a user to adjust the window and level settings. A pop-up window, not shown in FIG. 4, is used to access a tool kit of automatic tracing tools and similar options. Other windows, such as a parameter adjustment window, shown in FIG. 8, are used to adjust other settings and parameters within the system.

The preferred reduced scouts are depth shaded views of all intra-abdominal air. The rendering uses thresholding to identify the object to be rendered and very fast projection along cardinal directions. Depth buffers corresponding to each of these projections are also generated. These depth buffers are loaded with the average of the front surface coordinate and the first back surface coordinate. The buffers are used to determine three dimensional coordinates when a point is selected on one of the scouts. This feature simplifies pointing at the center of the colon.

Once the tracing of the colon midline has begun, four additional images are preferably displayed, as shown in FIG. 4. The first two images include 1) an off-axis cross section that is centered on the midline's endpoint and orthogonal to its final segment, and 2) a depth shaded intraluminal perspective volume rendered view from and aligned with the midline's endpoint.

The remaining two images are an innovative improvement of the "curved section" displays in well-known prior art medical imaging workstations. In conventional curved section displays, one axis is kept parallel to one cardinal direction in the scanned volume while the other tracks the specifying curve in the other two directions. The orthogonal pair of neo-curved sections included in the colon tracing subsystem of the present invention adapts to the extreme tortuosity of the colon and displays the identified midline as a straight line bisecting the displays. Each column of displayed imagery is preferably taken from along a line orthogonal to the colon midline in the scanned volume.

Manual Delineation of the Colon Midline

The midline can be identified manually in several ways. In a first method, coordinates can be identified by selecting a position in any of the scout views, shown in FIG. 4. Since the present invention automatically finds a point near the center of the colon, this is a quick and easy way to trace the colon. When the course of the colon is very tortuous, or the desired segment is obscured by other anatomy, the point identified may not correspond to the desired depth. In these cases, points can be selected in the reformatted 2D images.

A second effective method for extending the midline is to enter new points along the segment of the neo-curved sectional images which are beyond the current endpoint. Since the two views are orthogonal, alternately selecting new points in these two views can be used to extend the midline while keeping it centered in the colon.

It will be noted that the off-axis cross section is centered on the midline. Thus, the section will typically show a cross section of the colon that is centered on the image and is nearly circular. When points are entered in this image, the midline's endpoint is adjusted rather than extended. The image is therefore an effective tool for keeping the midline centered on the colon lumen.

Figure 5:
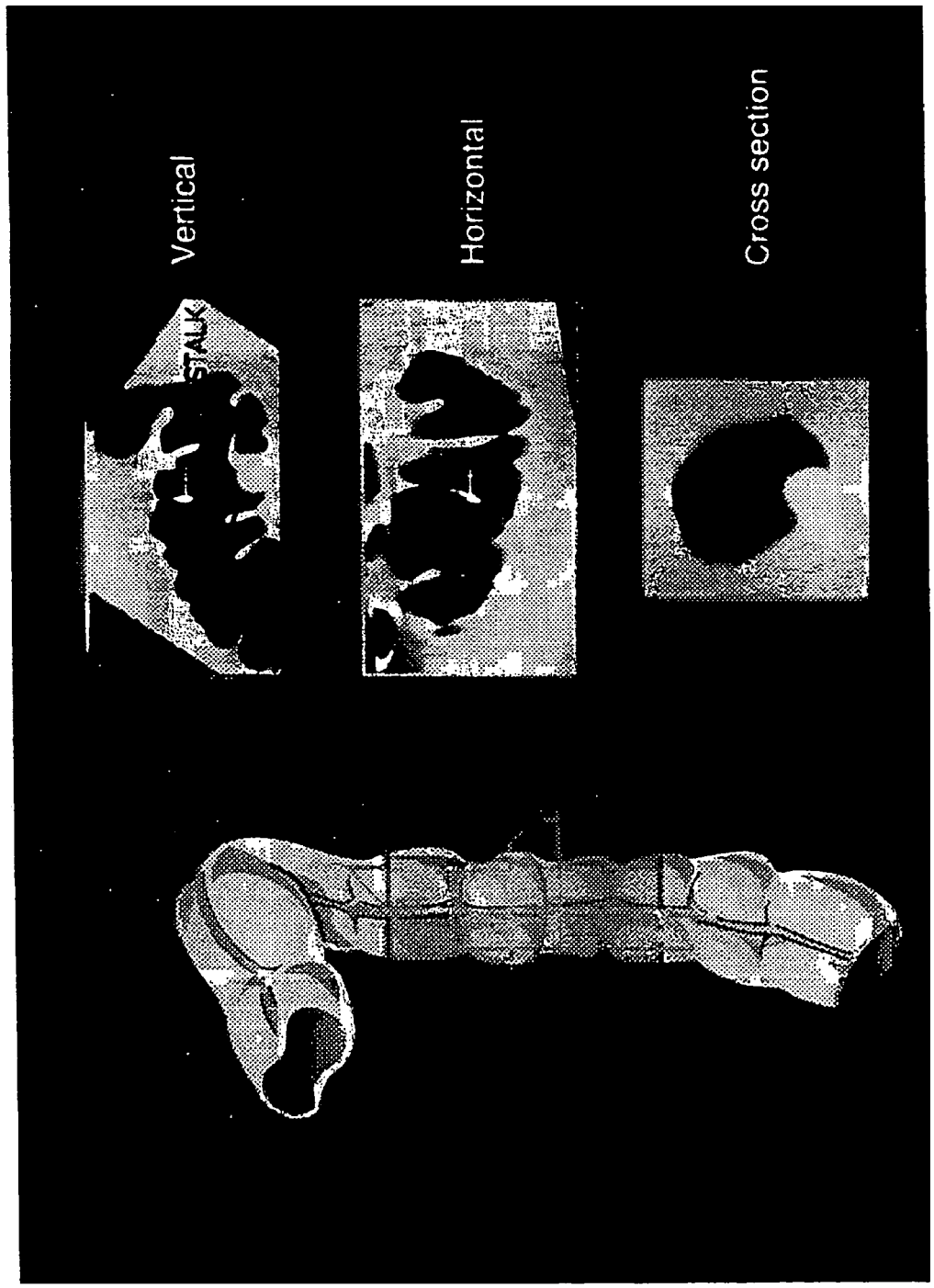
FIG. 5 is a screen display of cross section and orthogonal views to the colon centerline in a patient with a pedunculated polyp compatible with the present invention.
Figure 6:
FIG. 6 is a screen display of a diagnostic image collage compatible with the present invention.

Ten images are produced to facilitate centerline definition: 2D axial and reformatted coronal and sagittal images as shown in FIG. 5, 3D extraluminal renderings in axial, coronal and sagittal views as shown in FIG. 6, a mathematically straightened colon in coronal and sagittal orientations as shown in FIGS. 4 and 6; and a 2D cross section and a 3D interluminal view as shown in FIGS. 4 and 6. The observer begins at the anal verge and advances through the colon until reaching the cecum using any of the ten displayed images. The orientation of the midline can be ascertained using the 2D cross section or 3D intraluminal views, and can be adjusted by the observer on these images. The observer may remove any preceding step as needed by using the keyboard and can then resume tracing from the last correct point.

The mathematically straightened views of the colon greatly facilitate midline delineation. Occasionally the path of the colon, especially in the sigmoid, may be difficult to define. In this case, the observer can use the 2D axial and reformatted coronal and sagittal images to determine the path of the sigmoid colon without interrupting the trace. The pointing device on the workstation, typically a mouse, allows the observer to scroll through 2D images in order to determine the path of the colon. Permanent trace points are placed using the pointing device.

Automatic Methods for Colon Midline Delineation

Several automated approaches to colon midline delineation are known within the prior art. A first approach is the "Marching Cubes" algorithm which finds the shortest path between two identified points which, as used in the subject matter of this invention, stays within the lumen of the colon. Since the start and end points must be specified, this can not truly be considered totally automatic. In addition, the algorithm is also computationally intensive. Further, the path found by the algorithm is the shortest and thus does not pass along the center of the colon. Instead, it will pass along the inner surface of each curve, which frequently results in obstructed views accompanied by disorienting abrupt changes in direction.

A second approach uses K-T transforms to find principal eigen vectors which track the course of the colon. This algorithm can only be applied where the radius of curvature of the colon midline is greater than twice the diameter of the colon. Virtually all colons fail to meet this criterion in at least one segment. Therefore, this algorithm is typically unreliable in the subject matter of the present invention.

A third approach would be to morphologically thin a binary volume image of the colon lumen into a single line and then vectorize the longest resulting path by a method similar to algorithms developed for analysis of remotely senses watersheds. While this approach is theoretically possible, there are no known prior-art implementations which are successful at tracing the colon. In addition, the algorithm would most likely be computationally intensive and may not resolve difficulties with highly convoluted segments.

In addition to the problems with the three automatic midline delineation approaches discussed above, none would be able to adapt to discontinuous shapes that are typically present in scans which are acquired in multiple breath holds or when bowel distention is lost. To adapt to these conditions, each of the above techniques must accept manual supervision and thus become semiautomatic. For any semiautomatic approach to be viable in clinical situations, it typically must be completely integrated with a manual system and must be able to perform the tracing faster than an operator of a totally manual system. These criteria are quite limiting for current workstation technology. Some or all of the above-mentioned approaches may be acceptable for limited research applications and may be found in future systems based upon higher performance computers.

Two Approaches to Midline Delineation

The present invention incorporates semiautomatic tools to facilitate midline delineation. These are designed to be faster than a supervising operator and to exploit features of the system which are included for manual operation. Each of these approaches finds an approximation of the colon midline.

A first approach extends the midline in the direction of its final segment a fixed fraction of the distance to the point where this line would pass out of the colon lumen. This point is known a priori because it is acquired by reading the central point of the depth shaded intraluminal view which is always present. An off-axis cross section is extracted at this new endpoint as described above. A two-dimensional region growing algorithm is used to find the center of the lumen on this cross section. The midline endpoint is iteratively adjusted until a satisfactory point is found. Then the midline is again extended in the direction of the last segment and the process is repeated. If a point is reached where the adjustment fails to converge, or the operator objects to direction of progress, processing is returned to manual control.

A second approach to semiautomatic tracing makes more direct use of the depth shaded intraluminal rendering. The centroid of the visible region of the colon lumen is calculated by applying a special case of Green's Theorem to the surface represented in the rendered image: If V is the volume bounded by a closed regular surface S, and if u(x,y,z) and v(x,y,z) are scalar functions having continuous second partial derivatives, then $$\iiint_V (u\nabla^2 v - v\nabla^2 u)dV = \iint_S N \cdot (u\nabla v - v\nabla u)dS$$

where N is the out normal to the surface S which bounds V.

The use of Green's Theorem makes this calculation very simple and is preferably embedded in the rendering software itself. This technique therefore requires little additional computation and is not iterative.

Midline Interpolation

The traced colon midline is resampled to uniform length intervals. Various methods have been implemented and tested with the present invention. FIG. 7a illustrates a midline using linear splining, which results in abrupt changes in direction at each tie point. Cubic and parabolic splines were tried which yielded only approximately uniform sampling intervals and were often more erratic than was desirable, as shown in FIG. 7b. Second, a modified iterative parabolic spline and circular arc spline were used, which yielded uniformly spaced samples but also produced curves which were erratic. The problem with splines is that in passing through the data points, the splines are not smooth. Excessive curvature does not create excessive deviation of the line from a desired midline, but it does change the direction of the line sufficient to create an undesirable rocking of the perspective and off-axis views which are disorienting to the viewer and could potentially cause some small polyps to be missed.

The present invention therefore preferably uses a circular arc and tangent interpolation method. As illustrated by FIG. 7c, an arc which is tangential to the current midline end segment and passes through the next point is determined. If the next point is behind the current endpoint, then a p radian arc and a connecting tangent are used. If the arc is between p/2 and p, a p/2 arc and a tangent line are used. If in any case the radius of the arc is less than 2 cm, the arc is sampled at p/16 radian increments. Otherwise, the sampling is fixed at 1 or 2 mm intervals along the colon. This method is shown by FIG. 4. An example of the excessive curvature generated by polynomial splines is shown in the center drawing. The same points are connected by the preferred arc and tangent spline in the lower drawing.

Process 4: Support of Diagnostic Interpretation

Upon completion of midline identification, the CTC scan is typically ready for diagnostic interpretation by a radiologist. This interpretation is supported by another application specific image manipulation tool. The radiologist preferably explores a colon by interacting with an intuitive user interface to navigate along the course of the colon. The manipulation tool presents a synchronous dynamic collage of reformatted 2D and rendered images. These images include navigational scouts, reformatted 2D cross sections, a 3D intraluminal image, and a straightened colon image which presents the entire length of the colon.

Interactive Navigation Tools

Two of the rendered views of intra-abdominal air, used for navigation in the earlier program described above, are also used to assist navigation. However, it is not necessary for the system to use depth maps to determine three dimensional coordinates. Instead, a point along the midline which is nearest to a projection of the selected position is determined, as shown in FIG. 4. This point is selected for the new view point and the corresponding reformatted 2D and 3D intraluminal images are displayed.

Positioning along the midline can also be controlled by selecting points in the reformatted 2D images themselves. As described above in FIG. 4, two of these cross sections are aligned with the colon midline. Selection of points away from the longitudinal center of these images causes the view point to move at an equivalent distance along the midline. In this way, the plane of the other cross section can be manipulated to traverse features seen in these images. This same method of selecting new view points can be used to rapidly scan a region of the colon. When points are iteratively selected at the same position on the screen, the view point progresses along the colon midline. The speed of this progress is determined by the distance between the selected point and the center of the view.

The position of the midline can also be controlled by selecting points along the straightened colon image described above. Generally, the length is too long to be displayed in its entirety on the workstation's screen. Instead, a segment is displayed at full resolution while the entire strip is displayed at a fractional scale. The segment to be displayed and the active view point can be selected using the scaled down section. Thus, the scaled down section functions in an analogous way to a horizontal "elevator" control common on graphical user interfaces. The plane of this cross section in the volume image of the straightened colon corresponds to a convoluted ribbon which bisects the colon along its axis. The orientation of this cut plane relative to the axis of the colon can be altered. This is done by selecting position in the off-axis cross section which is orthogonal to the midline. When the orientation is altered, a line is displayed in this section along the intersection of the two sections. This line is also ruled so that radial sizes can be measured.

The present invention does not require that the view point be limited to the midline. Images can be rendered from any position by selecting a view point on the 2D reformatted images. In an embodiment of the present invention, by pointing the cursor and simultaneously pressing the "Shift" key on the keyboard, an observer can "jump" off the midline and all images, including 2D reformatted images, 3D intraluminal images, and the 2D axial image are updated to views corresponding to the designated position. A fiducial mark on all images identifies the new position. The observer can advance both forward and backward along the new path or using the pointing device, return to the nearest point on the predetermined midline.

3D Intraluminal Image Display

A 3D intraluminal image view is rendered that roughly corresponds to the video images from colonoscopy. Several prior art investigations use only these rendered views, and as such this technique is known as "virtual colonoscopy". As described above, a variety of rendering methods have been examined for use with the present invention which support interactive reorientation. For these methods, the view direction is controlled by selection of points in the rendered image. This causes the scene to be re-rendered with the selected feature at the center of the view.

Additionally, the view direction is represented and can be controlled in the navigational scouts. A bold fiducial mark such as a dot marks the current view point in these projections. A line segment extending from this point in the direction of the center of the rendered view is also shown. By manipulating the orientation of this indicator in the rendered scout, the radiologist can control the view direction with clear external reference points.

The display software preferably displays six 2D images: a reformatted 2D image, two orthogonal images, a view of the entire straightened colon, an enlarged image of one section of the straightened colon, and the raw axial 2D image. Two views of the three dimensional intraluminal images are displayed to the medical practitioner. The first is a forward view, and the second is a "rear-view" image looking backwards. Displaying both views makes it less likely that a feature of interest will be obscured due to the topology of the colon. Two 3D extraluminal renderings of the colon are displayed in axial and coronal orientations.

Several interactive features are available, including window and level settings, orientation of the 3D camera angle, and zoom adjustment of the 3D camera. The observer can choose which area of the colon to inspect by choosing a point on the extraluminal renderings of the colon or on the two straightened images of the colon. A measurement in millimeters from the anal verge is also displayed. Another feature allows the observer to inspect the entire colon wall surface. Using the reformatted 2D image, the observer can choose a slice of the colon wall to display as the straightened image. By sequentially rotating the orientation of the slice in either a clockwise or counterclockwise direction, the entire colon wall can be evaluated.

An observer typically begins viewing in the anal verge and advances along the trace using the workstation keyboard. Images can be displayed in both forward and reverse order. Colon polyps and cancers can be detected on both 2D and 3D images. Unlike 3D images, 2D images allow assessment of the colon wall/soft tissue interface so that the depth of the colon cancer invasion or other extraluminal disease process can be assessed.

As images are displayed, a bold fiducial mark is placed in the corresponding location on the extraluminal images. In this way, the observer knows which areas of the colon have been inspected. If an abnormality is detected, its location can be determined using both the extraluminal images as well as the measure report in millimeters from the anal verge.

Data Rendering

The present invention reduces the amount of time spent examining a patent's image data set by utilizing a 3D rendering technique that facilitates fast interactive evaluation of the image data set. In the known prior art, two types of data rendering are typically used to display 3D images views of the colon. The first type is surface rendering and the second type is volume rendering.

Surface rendering relies on a pre-processing step, known as segmentation, to identify the inner or mucosal surface of the colon and represent it as a mesh of triangles. A rendered view of the colon can then be generated very quickly by projecting each of these triangles onto a plane representing the display.

Volume rendering works with the 3D array of densities which comprise a CT scan volume. Each element or voxel in the array is projected onto a plane to generate a two dimensional rendered display image. If the entire volume array is used, it is possible to depict CT density as translucence in the rendered scene.

The process typically involved with volume rendering may require the evaluation of over one hundred times as much data as surface rendering, so volume rendering is typically much slower than surface rendering. For example, to generate an average rendered scene, approximately 20 computations must be performed on each volume element. Given that a 300 slice CT scan may contain over 75 million voxels, rendering such a volume on a computer capable of performing 100 million useful operations per second would require approximately 15 seconds.

Although the volume covered by a CTC scan is approximately 40 liters, the portion of this volume which is visible in an endoluminal view is typically less than 400 ml. The rendering technique embodied in the present invention uses this fact to limit the amount of processing by only evaluating relevant data within the volume array.

Figure 9:
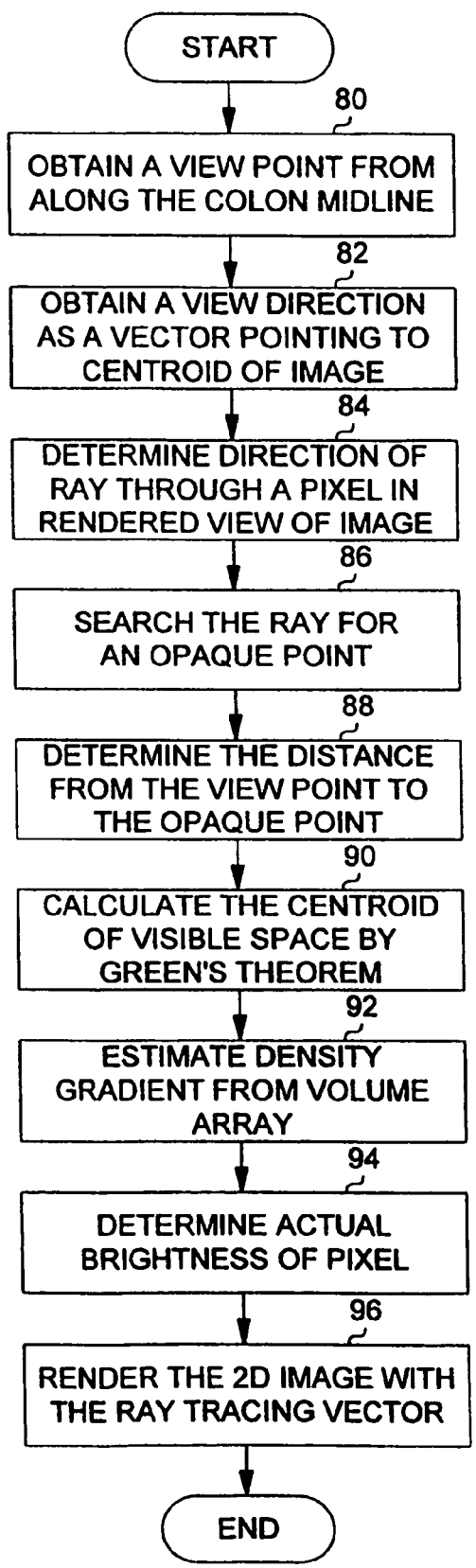
FIG. 9 is a flow diagram illustrating a method for rendering a 3D image compatible with the present invention.

FIG. 9 illustrates the preferred rendering method of the present invention. The rendering process of the present invention starts at block 80 by obtaining a view point within the volume array which is used as a virtual camera location. At block 82 a view direction is obtained which is used as the orientation direction of the virtual camera. The view point and view direction may be derived from along the colon midline, the centroid of the prior image rendering, or may be manually specified by the user. For each display point or pixel in the rendered view of the image, the rendering process determines the direction for a ray from the view point though the pixel at block 84. The ray is then cast along this direction through the volume array. At block 86, the ray is searched for an opaque point. The search is performed by sampling the volume array at uniform intervals along the ray. The interval is selected to coincide with the sample interval in the scan, allowing for the use of bilinear interpolation, instead of trilinear interpolation, which is typically used in volume rendering but requires nearly twice as many computer operations. At block 88, the exact distance from the view point to the opaque point on the ray is calculated by linear interpolation of the last two point values of the ray determined at block 86.

Block 88 results in the determination of a vector from the virtual camera to a point on the rendered surface. The centroid of the space visible in the rendered scene is preferably determined by applying Green's Theorem over the surface which is specified by the sum of all vectors determined at block 90. Rendered scenes which reflect the angle between the surface and the cast ray are preferred over simple depth shading. It is also desirable for the scene to reflect the density gradient along the cast ray. Estimating the density gradient is performed at block 92, where a density is preferably extracted from the volume array by trilinear interpolation to a point at a fixed distance beyond the opaque point on the array determined at block 88. The value of the fixed distance may be varied according to a "burrow depth" parameter, shown in FIG. 8. This enables an observer to manipulate the relative weighting of the two display properties, shading and density, described above. The actual brightness of a corresponding pixel in the rendered image is determined at block 94. The brightness of the pixel is determined as a linear combination of the density from block 92 and the distance from the view point to the opaque point on the ray from block 88.

Figure 10:
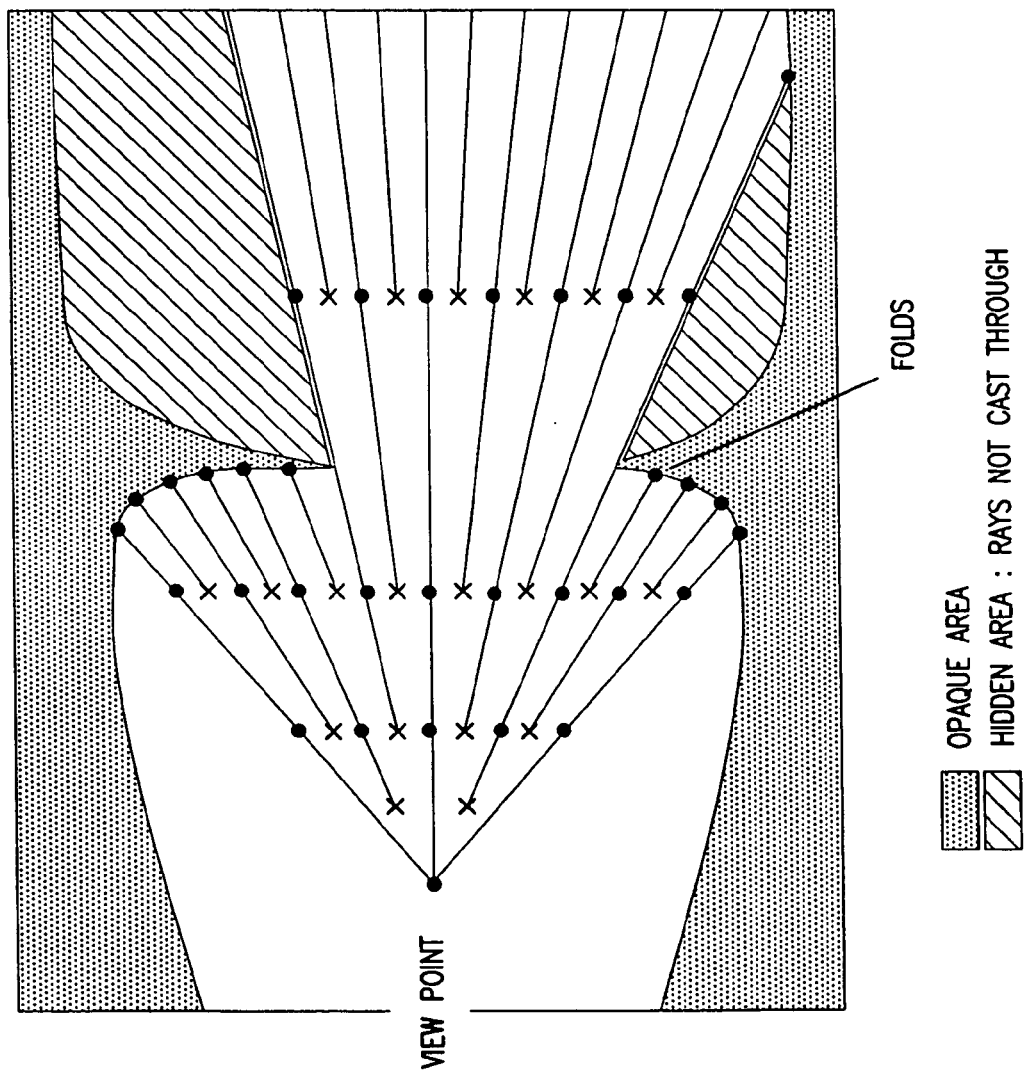
FIG. 10 is a schematic diagram illustrating a ray casting method compatible with the present invention.

In the preferred embodiment of the present invention, the steps shown in FIG. 9 are not all performed sequentially. Blocks 80 and 82 are performed selectively, then blocks 84 and 86 are performed for all pixels in the rendered scene. The processing loop for the earlier portion of this process is typically the most computationally intensive, but can be made more efficient by isolating it from the rest of the process steps. The process loop is performed at successfully higher resolutions and over progressively greater depth ranges. The start point for each ray in one iteration is determined from the result of the prior iteration, as shown schematically in FIG. 10.

Because the rendering of a 3D image stops when the racy tracing vector encounters the internal surface of the colon, a large amount of data which is not visible to the observer is eliminated, which greatly reduces the number of computations required to generate the ray traced image. This results in a volume rendering process with computational requirements similar to that of a surface rendering process. It will be recognized that the rendering technique of the present invention accommodates any view point along any view direction, and that a detected surface along the ray may represent structures other than the internal surface of the colon.

Opening the Colon

The present invention assists a medical practitioner with the diagnostic interpretation of medical images by displaying an unfolded or opened view of the colon. The opened view of the colon corresponds to a view of the entire colon as if it had been physically divided and opened for inspection. There are at least four methods for opening the colon.

The first method for opening the colon divides the colon in two along the planes of each of the longitudinal cross sections. This division creates a first half and a second half of the colon. An isometric volume rendering is then performed for two views of the colon, a view of the first half and a view of the second half, looking through the planes of each of the longitudinal cross sections. This process typically works best in segments where the colon is relatively straight, such as the ascending colon, descending colon, and possibly the transverse colon.

The second method for opening the colon divides the entire scan volume in two along a curved surface which passes through the colon midline and is parallel to one of the cardinal directions of the scan. As in the first opening method described above, an isometric volume rendering is then performed for the two views of the colon looking through the plane created by the division step.

A third method for opening the colon mathematically straightens the colon prior to sectioning, as in the first opening method described above. This straightening will typically distort the colon. However, the distortion will typically be less than is often seen in perspective views.

A fourth method for opening the colon involves distorting the colon such that rays projected from the straightened colon midline through the colon surface are represented as if they were parallel. As in the third opening method described above, this will further distort surface features of the colon, but may not necessarily adversely affect the readability of the colon rendering.

Synchronous Interpretation of Supine and Prone CTC

As with any screening examination, false positive results will slightly increase the overall cost and risk associated with CTC. Conversely, false negative results have the much more serious consequences of failing to detect a potentially life-threatening condition. The missed polyps are often in colon segments which were either liquid-filled or collapsed.

Dual scanning is an effective solution to eliminating the false results. Basically, a subject, in additional to being scanned in a supine position, is repositioned on a scanner table in a prone position for a prone scanning. The images which result from each scan are reconstructed, archived, and transferred to an off-line interpretation workstations.

The addition of the prone scan has at least several advantages. One is that dependent surfaces which were covered by liquid stool in the supine scan are now exposed in the prone scan so that false results are substantially eliminated. Further, the insufflation gas redistributes so that colon segments which are collapsed on one exam will be adequately distended on the other. The prone scan contributes to diagnosis even when the colon is adequately dry and distended. It is often not possible to distinguish residual solid stools from colon polyps with a single scan (i.e. the supine scan or the prone scan). In dual scans, however, as a patient is moved into the prone position, the residual solid stools are transferred from one surface of the colon to the other. Since polyps are not free to move, this repositioning of the subject in the prone scan makes solid stools' identification unambiguous. An additional advantage of the prone scan is that the location of breaks between breath held acquisitions are in different places. This may provide uninterrupted views of locations which appear broken on the other scan.

However, one disadvantage of the dual scanning is that the interpretation time of the dual scans doubles because two separate individual interpretations will have to be made by a user. The user views and interprets each scan individually by tracing along a midline at each time. Furthermore, as stated above, it is very useful to compare the two sets (e.g. prone and supine) of images. Making these comparisons is very difficult with most image interpretation systems due to the fact that the scanned images are individually traced. The present invention uses a dual scan interpretation tool that establishes corresponding relationship between two scans at each particular position and synchronously view the dual scans at a desired position requested by a user during the interpretation. Accordingly, only one interpretation of the two simultaneously displayed images is needed to be made by the user.

Figure 11:
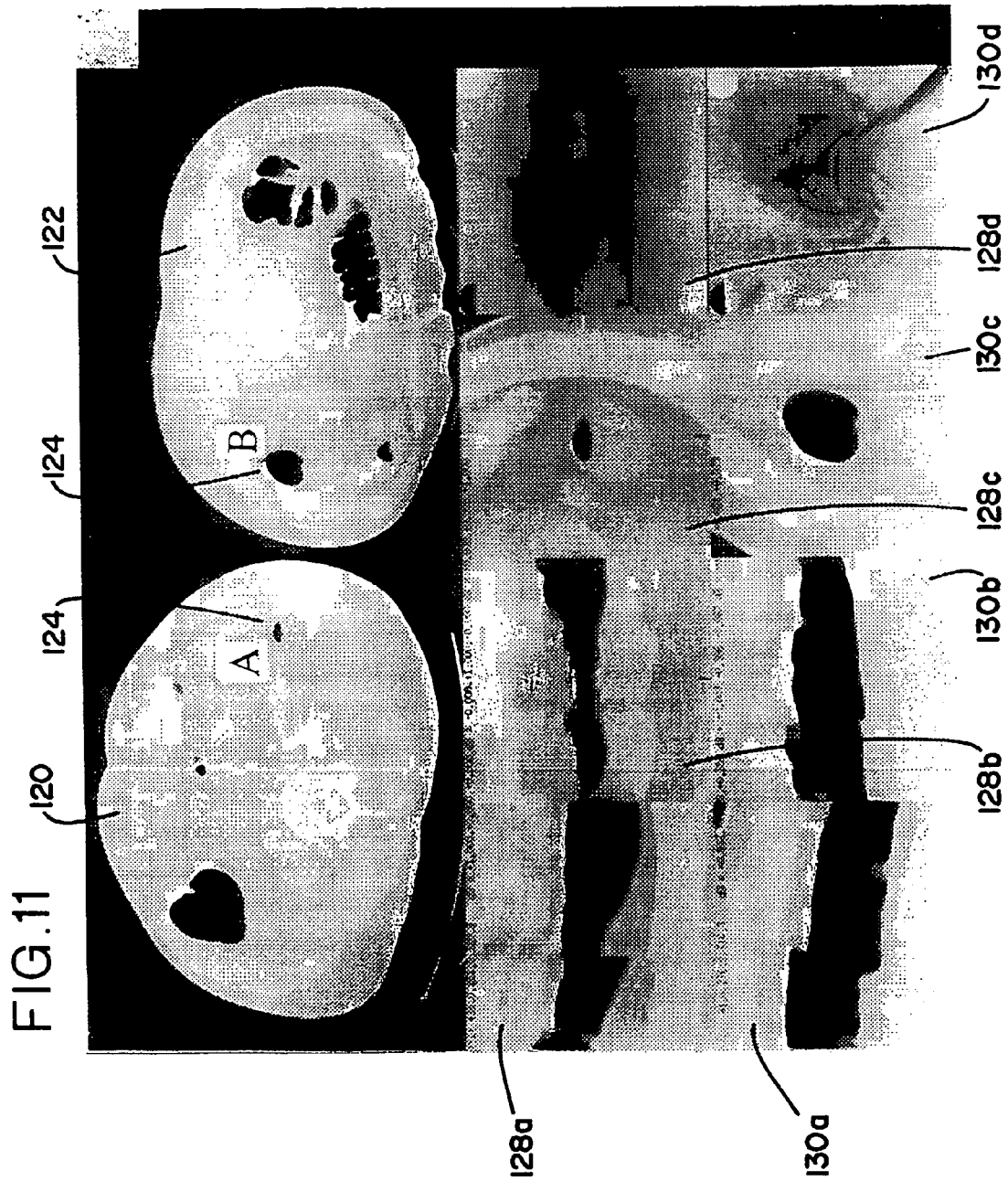
FIG. 11 is a screen display of a diagnostic image collage compatible with the present invention illustrating dual scanned images.

As shown in FIG. 11, a display screen of dual scanned images is shown. In this mode, corresponding axial images 120, 122 from the supine scan and the prone scan, respectively, are illustrated at the upper portion of the screen display. As shown, the descending colon 124 is nearly filled with liquid stool on the supine scan (A) but empty and well distended on the prone scan (B). Three transcolonic sectional views 128a, 128b, 128c from the supine scan (A) and one endoluminal, perspective, volume rendered view 128d appear just below the axial image 20. The corresponding images 130a, 130b, 130c, and 130d from the prone scan are displayed at the bottom of FIG. 11. The scans can be either interpreted independently or simultaneously. Synchronous or simultaneous interpretation of the scanned images makes it possible to read both supine and prone scans in almost the same amount of time as would be required to carefully interpret either scan individually. Since this amounts to cutting the interpretation time in half, and a radiologist's interpretation is the most expensive single aspect of using CTC technology, substantial cost reduction of the system has been achieved. There are now two primary display formats produced by the system. One of these modes displays images from either the supine or the prone acquisitions. The other mode simultaneously displays images from corresponding points in both scans.

Single Scan Display Mode

Figure 12:
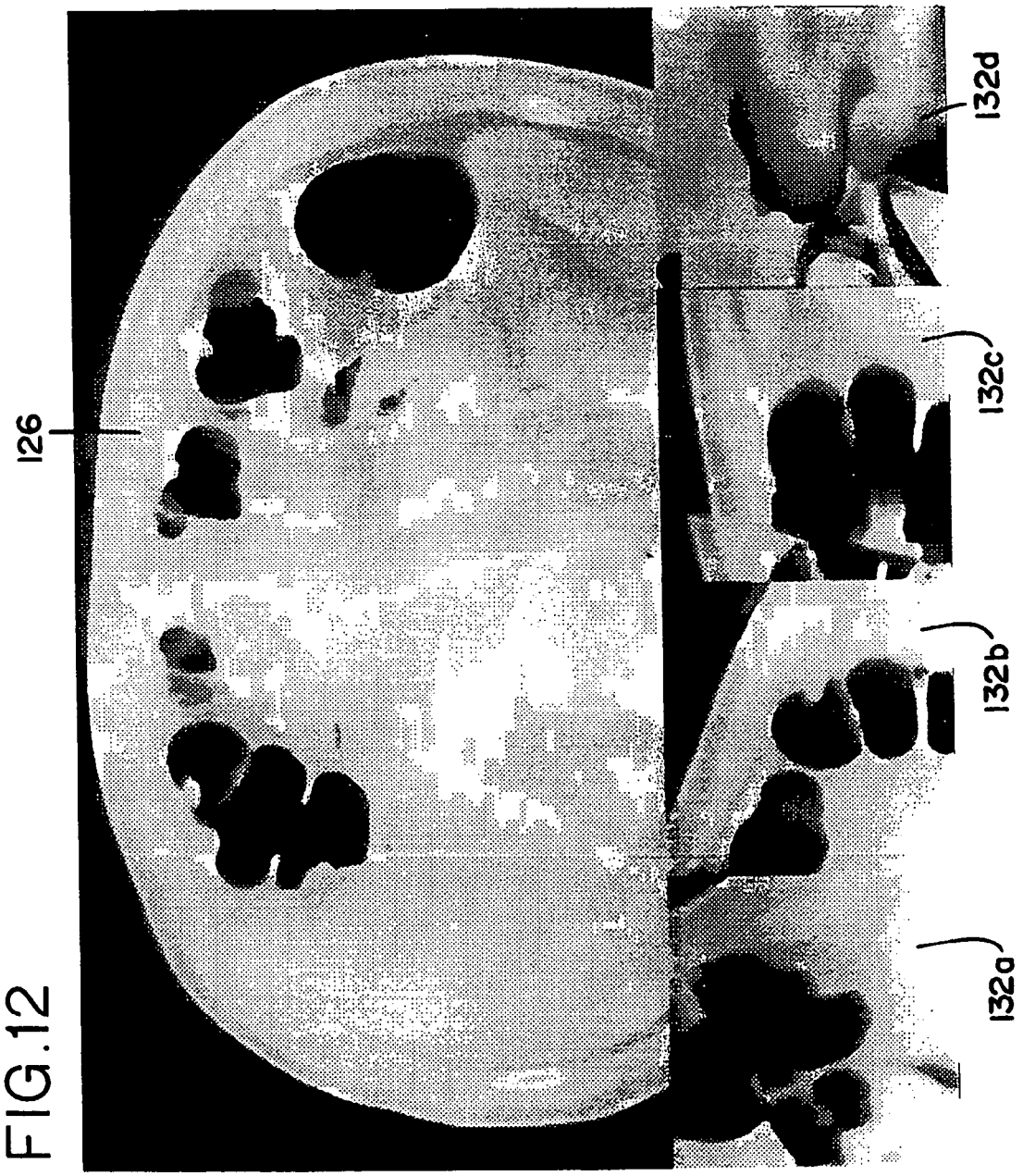
FIG. 12 is a screen display of an enlarged image collage of one of the dual scanned images selected by a user compatible with the present invention.

FIG. 12 illustrates a single scan display mode showing an enlarged view of either a supine scan or a prone scan shown in FIG. 11. A user can switch the display between the dual scan display mode and the single scan display mode as later explained in FIG. 18. In the single scan display mode, the upper three fourths of the screen are covered by a single enlarged axial tomogram 126. The lower segment of the display contains three transcolonic sectional views 132a, 132b, 132c and one intraluminal rendered view 132d as described earlier.

Navigation through an axial stack is done by simply repositioning the computer mouse over these views. The lateral position of the cursor determines which image is displayed. This is the mode of operation which is preferred by radiologists for most of the colon interpretation. Only when a suspected lesion or other structure of interest is selected for additional viewing are the derived CTC views generated. After these additional views are generated, further navigation is performed by interactively moving the view point or the direction of view. Either of these can be manipulated by selection of the corresponding mouse button with the cursor located over the desired point in any scene.

There is a choice of two possible interaction methods. In one interaction method, a point of view and rendering orientations are controlled by the middle and left mouse buttons, respectively. In the other configuration, the user identifies an object of interest with the middle mouse button. Then, operations of the left mouse button move the view point, but the selected object remains at the center of the view. This later method reduces the number of operations required to obtain an appropriate view. It will be appreciated that other configurations or interactive methods, such as defining different mouse buttons or other input devices to achieve the same function, can be used within the principles of the present invention.

Further in FIG. 12, there is also a very narrow, iconic menu bar on the right edge of the display (not shown). Views are displayed and other control settings are adjusted through the use of this menu. Among the views that can be displayed are two transcolonic sectional views which bisect the selected intraluminal rendering, an additional transcolonic sectional view perpendicular to the look direction, the rendered endoluminal perspective Virtual Endoscopy (VE)

view, and an additional rendered view oriented opposite to the main view. Another one of the Graphic User Interface (GUI) buttons on this menu allows the system to return to the dual scan displaying mode shown in FIG. 11, which is later explained in FIG. 18.

Dual Scan Viewing Mode

In a dual scan displaying mode as shown in FIG. 11, the dual scan screen layout shows one axial image from corresponding levels in the supine and prone scans. These images are roughly one half of life-size. The precise scale depends on a workstation screen size, a reconstruction circle size, and other parameters. There are also two sets of transcolonic sectional views 128a–c (or 130a–c) and two sets of rendered view 128d (or 130d). One set 128a–d is derived from the supine scan. The other set 130a–d is from the prone scan. The position and orientation of the view points used in these images are manipulated in the same manner as used in the single scan mode.

The GUI menu bar described in the earlier-mentioned system of a single scan displaying mode is also available in this dual scan displaying mode. The button which allowed transition into the dual scan displaying mode (FIG. 11) is replaced by a pair of buttons which allow selection of the single scan displaying mode (FIG. 12) of either the supine or the prone series.

Automatic Interscan Registration

In one embodiment of the present invention, lists of corresponding image numbers are maintained. These lists can be used as look up tables. Each time an image is displayed from one scan, a table look up is performed to select an image from the other scan. These look up tables may be calculated from coordinates along a traced midline. Some form of colon midline identification can be used in virtually all CTC interpretation systems. One scan protocol preferably used is to scan an abdomen in multiple breath holds. The option is to scan with shallow breathing by a subject, such as a human. This would generally distort the colon and can cause polyps to be missed. The preferred protocol may include overlapping scans to avoid the possibility of failing to scan a section of the colon. However, this also complicates midline extraction and interscan registration.

One embodiment of the present invention provides an interbreath overlap removal technique which can be used to resolve the distortion or faultline and to reduce the number of images needed to be interpreted. However, semi-automated midline extraction is only possible with a data set if proceeded by breath gap resection. The automatic removal of breath overlaps is performed as follows: by evaluating image acquisition times and table positions, the break between breath holds can be identified. Then correlations are calculated for images on either side of the identified gap. e.g.: The first image before the gap is compared to the first image after the gap, and the second image before the gap is compared to the second image after the gap, and etc. The distance between images which are most similar indicates the thickness of the overlap. Then images from each side of the gap and separated from each other by this distance are compared. The best correlation in the comparison selects the best place to join the two image sets. All of the images between the selected pair are temporarily discarded. The resulting volume image is a joining of acquisitions from several breaths which has minimal discontinuities at the levels where the sets are joined. Semi-automated midline extraction is then performed on this volume image.

After the colon midline has been identified, all locations where the colon midline crosses a breath gap are identified. The tracings are modified near these locations. This modification results in two separate paths through the region where scans overlap. Which path is used is determined by the orientation of the view. Specifically, the sign of the z component of the heading vector determines which path is used. This is done in such a way that the faultline artifact resulting from the joining of two separate breath hold acquisitions is only displayed in the remotest regions of the rendered view. As this faultline is approached, a point is crossed where the entire scene can be rendered within the other scan. At this point, the alternate path is chosen. This results in only subtle changes in anatomic shapes and is often unnoticed by the observer.

Further, a traceless interpretation can be used to adjust interscan registration. One of the ways in which reductions in interpretation time are achieved is to abandon midline extraction. The reason for generating the midline is primarily to free the interpreting radiologist from having to concentrate on navigating through the colon. With the axial cine mode of interpretation it is no longer necessary to restrict concentration to a single point along a predetermined flight path. These changes have made significantly accelerated interpretation. It would not be necessary to revert to the use of the midline tracing methods. However, this alternative method of abandoning the extraction of a colon midline has made interscan registration much more difficult. Generally, it is more efficient to only do rough automatic registration prior to dual scan interpretation. Even when no midline extraction is done, the identification and repair of breath gap faultline artifacts described above may be valuable. This is most useful in improving the quality of the rendered Virtual Endoscopy (VE) views. Care has been taken to insure that all of the acquired images remain available for interpretation. However, this is a potential problem because navigating to a level in one examination, which is in a region of overlapping scans in the other examination, forces the software to choose which of the two coincident images in the second examination to display.

One of the simplest approaches to this problem is to concatenate the acquisitions without attempting to correct for overlap. This causes the examinations to be imprecisely registered. While it does burden a user, such as a radiologist, with the necessity of additional navigation, this simplistic approach does not too adversely impact readability of the joined examinations.

Virtual Pathology For Interpretation of CTC

"Virtual Pathology" has significant advantages over virtual endoscopy. The term "Virtual Pathology" is used to describe a wide variety of volume rendered images. The defining characteristic of these displays is the exposure of large regions of the colon for rapid interpretation. By breaking from the restrictions that limit and colonoscopic interpretation (virtual or real) to a confined path, virtual pathology has made it possible to examine the entire colon without having to navigate each tortuous bend and fold.

There are many different rendering techniques which fit the general description of virtual pathology. The conceptually simplest rendering technique is volume rendering of the opaque torso with movable "cut-planes."

Figure 16:
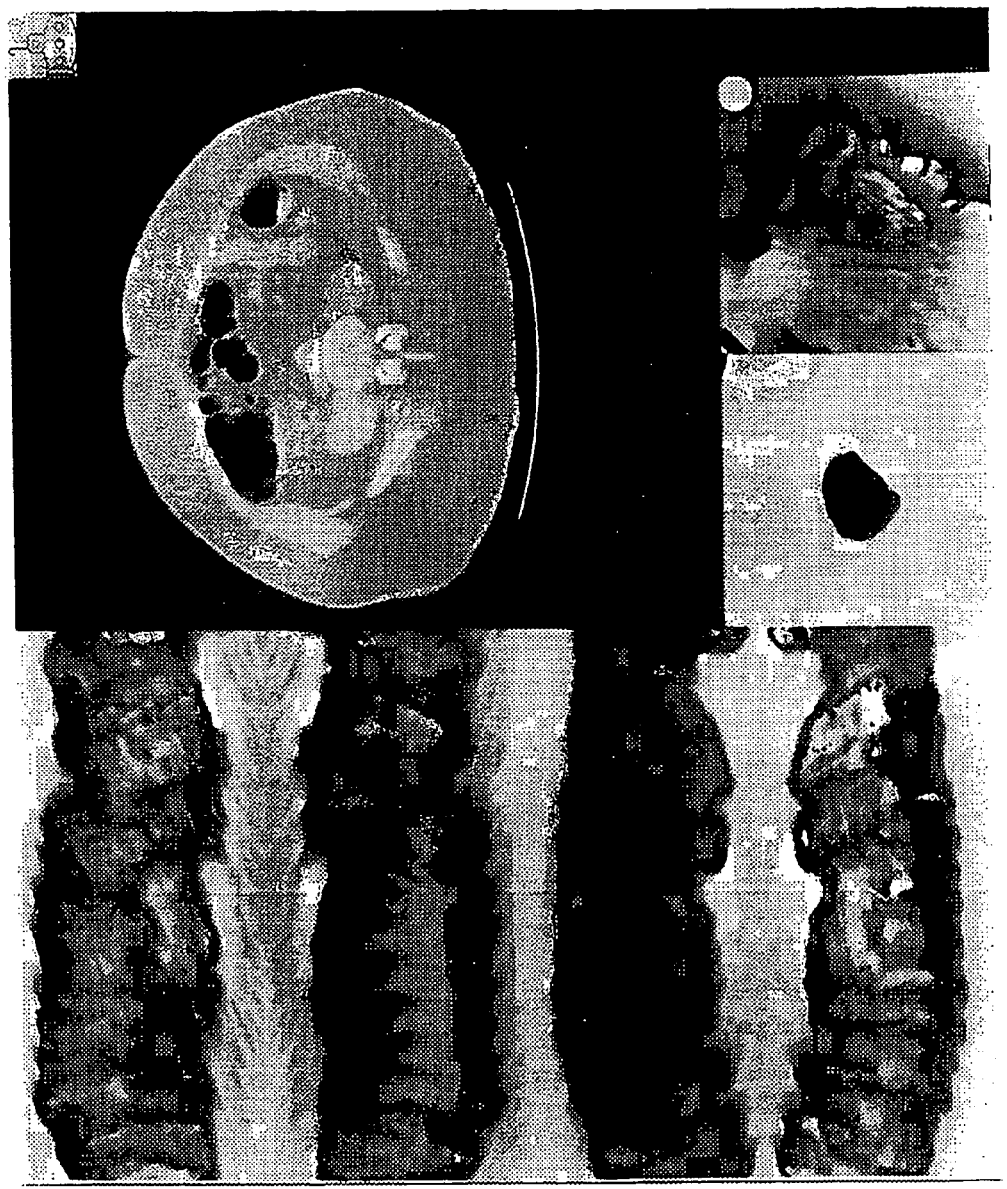
FIG. 16 is a screen display of a type of a Planar Virtual Pathology (PVP) and the corresponding tomographs compatible with the present invention.

One virtual pathology is called "Planar Virtual Pathology (PVP)" as shown in the left half of FIG. 16. Other images, such as the axial image, transcolonic sectional views, and/or endoluminal perspective volume rendered view, can be displayed on the same screen with the PVP views. PVP technique uses isometric projection volume rendering through transcolonic cut planes. A line that is tangent to the colon midline is selected. Then two perpendicular planes which intersect along this line are selected. In one embodiment, six centimeters wide and 12 centimeters long rectangles which are centered over the tangent lines intersect with the colon midline are used as cut plane windows. Volume rendering is performed by casting rays through the transparent (air-filled) fraction of these windows. The four resulting images, called Planar Virtual Pathology (PVP), show bisected views of a colon segment. In this manner, each portion of the colon surface is displayed twice.

Figure 17:
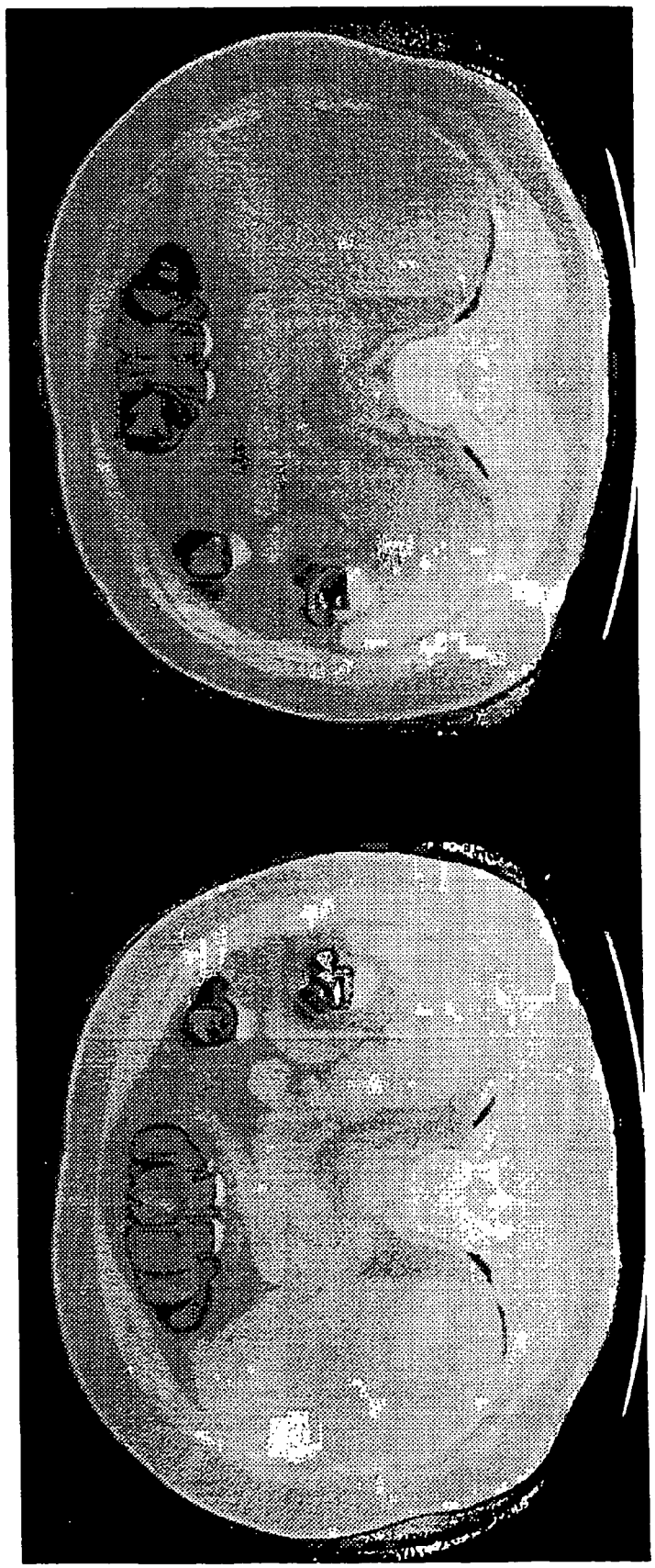
FIG. 17 is a screen display of an Axial Planar Virtual Pathology (APVP) compatible with the present invention.

Axial PVP or called Axial Virtual Pathology (AVP) is a related technique which applies the cut plane rendering of PVP with the large axial views. Where the axial plane intersects the air-filled colon, volume rendering is performed. A pair of axial views are displayed in FIG. 17. It shows the same axial cross section as viewed from the foot (left) and from the head (right). The rendering of these views can be performed very quickly. The rendering is only performed where the axial images depict intra-abdominal air. There is a great deal of redundancy from one level to the next. This makes it possible to generate a scene adjacent to one that has already been rendered by casting only about ten percent of the required rays. Additionally, all of the rendered rays are parallel to the z-axis. These rays can be cast much more quickly than rays with arbitrary orientation.

Figure 13:
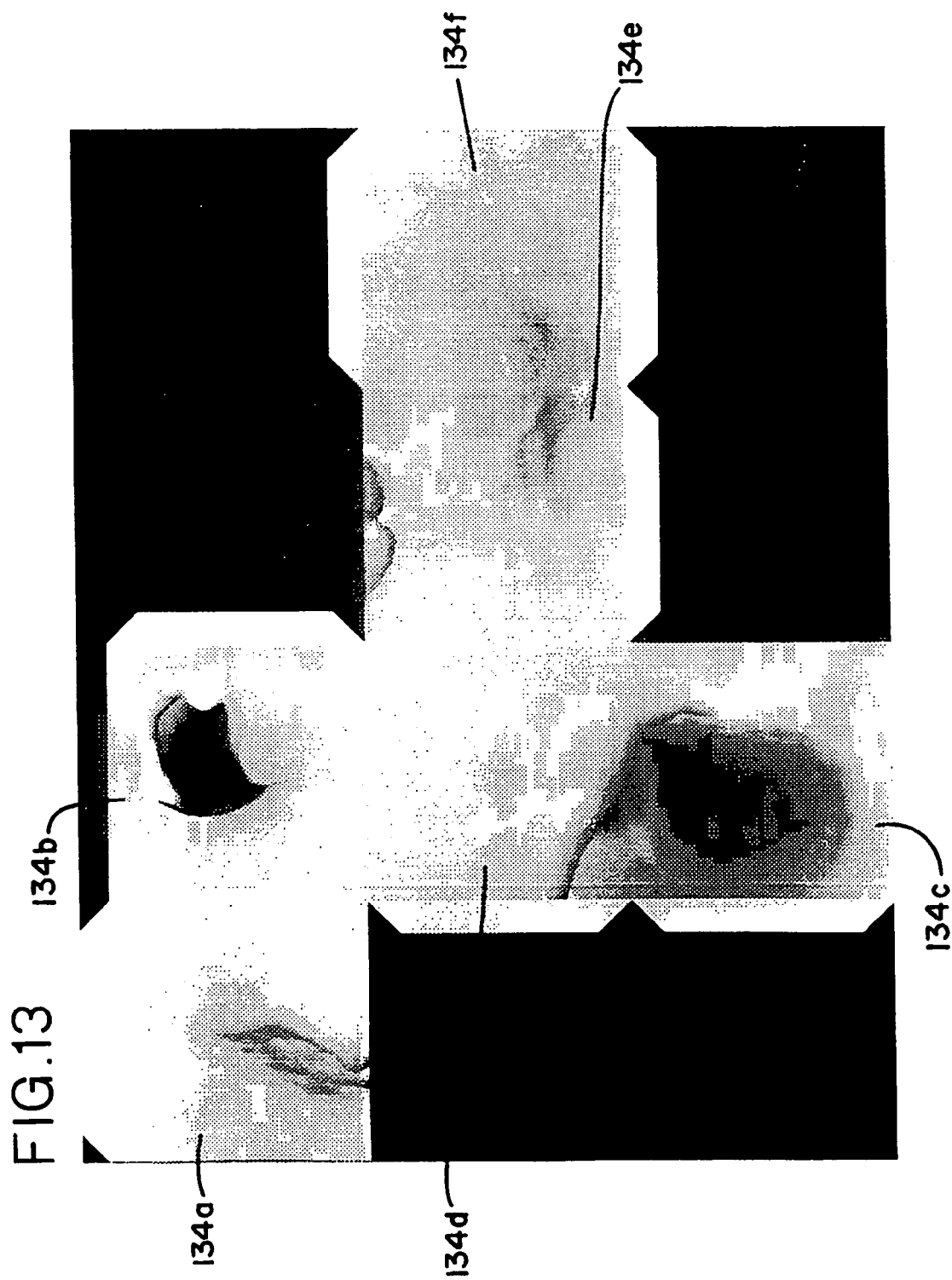
FIG. 13 is a screen display of an example of a Panoramic Virtual Endoscopy (PVE) compatible with the present invention.
Figure 14:
FIG. 14 is a screen display of an example of a Cylindrical Virtual Pathology (CVP) compatible with the present invention.
Figure 15:
FIG. 15 is a screen display of an example of a Mercator Virtual Pathology (MVP) compatible with the present invention.

FIGS. 13–16 illustrate other types of virtual pathologies which can be used interpret the CTC. FIG. 13 shows an example of a Panoramic Virtual Endoscopy (PVE). Generally, in a PVE, six images 134a–134f at each point along the colon midline are rendered. These images are aligned with the image coordinates and each has a ninety degree field of view. These panoramic images provide the entire endoluminal surface without further manual navigation. FIG. 14 illustrates an example of a Cylindrical Virtual Pathology (CVP). Generally, CVP views are formed by casting rays perpendicular to a straight line which approximates a segment of the colon midline. The CVP views may be analogous to the result of splitting a segment of excised colon and opening it to expose its inner surface. Interpretation can be performed interactively or by viewing a series of precomputed CVP views. FIG. 15 demonstrates an example of a Mercator Virtual Pathology (MVP). Generally, MVP views are generated by casting rays from a single view point in all directions, which results a panoramic image. Finally, the left portion of FIG. 16 shows a Planar Virtual Pathology. Generally, PVP uses image planes of the two longitudinal transcolonic sections as cut planes within isometric volume rendered images. Images are rendered with rays passing orthogonally through these planes from both sides.

Another virtual pathology is called "Curved Cut-plane Virtual Pathology (CCVP)" (not shown). Rendering of the colon surface opaque, as is done in PVP, seems to be more appealing than the translucent views of Dual Contrast Barium Enema (DCBE) and the simulations thereof. A curved cut-plane is determined which bisects the colon. This plane is extended several centimeters beyond the colon surfaces. Two views are rendered. One shows the abdomen with segments cut away to reveal the dependent surfaces. The other shows the segment which was excised.

It will be appreciated to a person skilled in the art to recognize that other types virtual pathologies can be used to interpret the above discussed Computed Tomographic Colography (CTC).

FIG. 18 shows an operation of imaging a human body with a medical imaging device providing synchronous interpretation of supine and prone computed tomographic colography and an operation of switching between a dual scan displaying mode, e.g. as shown in FIG. 11, and a single scan displaying mode, e.g. as shown in FIG. 12. The imaging operation starts in box 136. The Computed Tomographic Colography system generates a medical image data set of tubular or similar structure in box 138. The generation of image data set can be performed by scanning the structure. In boxes 140 and 142, the system determines whether a dual scan displaying mode or a single scan displaying mode is requested by a user. If a dual scan displaying mode is requested from box 140, the system interactively scrolls through stack of slice pairs in box 144. In box 146, a desired 3-dimensional view and/or cross-sectional views for the supine scan are displayed. Synchronously, a desired 3-dimensional view and/or cross-sectional views for the prone scan are displayed in box 148. It will be appreciated to skilled in the art that the sequence of the displays in boxes 146 and 148 is interchangeable and likewise can be simultaneous. In box 150, the system is to determine whether the imaging operation is done. If yes, the imaging operation ends in box 152. If no, the system determines whether a user has requested to switch the display from the dual scan displaying mode to the single displaying mode in box 154. If no, the imaging operation goes back to box 144. If a switch request is requested, the system switches to a single scan displaying mode on the left side of FIG. 18 starting with box 156. Likewise, if the system initially determines that a user requests a single scan displaying mode in box 142, the system goes to execute box 156. In box 156, the system interactively scrolls through stack of enlarged tomograms. A desired 3-dimensional view and/or cross sectional views are displayed in box 158. In box 160, the system generates various virtual pathology views as desired. They may include a PVP, MVP, CVP, APVP, or Panoramic VE view. In box 162, the system is to determine whether the imaging operation is done. If yes, the imaging operation ends in box 152. If no, the system determines whether a user has requested to switch the display from the single scan displaying mode to the dual displaying mode in box 164. If no, the imaging operation goes back to box 156. If a switch request is requested, the system switches to a dual scan displaying mode on the right side of FIG. 18 starting with box 144.

It will be appreciated to a person skilled in the art to recognize that multiple scan displaying modes can be displayed synchronously and switched readily among themselves without departing from the principles of the present invention. It will also be appreciated that the imaging and switching operations described in FIG. 18 and the foregoing description of the preferred embodiment of the present invention are presented for the purposes of illustration and description. It is not intended to be exhaustive or to limit the invention to the precise form disclosed. Many modifications and variations are possible in light of the above teaching.

The present invention is to be limited only in accordance with the scope of the appended claims, since others skilled in the art may devise other embodiments still within the limits of the claims. In addition to perfecting CTC for colon screening, the present invention may also be applied to the examination of other tubular structures within the body. For example, at least the two dimensional aspects of the present invention may help evaluate aortic dissection and other CT angiography applications.

What is claimed is:

1. A method for operating, in a dual display mode, a digital computer system of the type having a processor and a screen display, to provide diagnostic images of a tubular structure of a human body at a series of viewpoints along the structure, comprising:
    receiving a first image data set representative of a portion of the body including at least the tubular structure and generated by a medical imaging device with the tubular structure in a first position;
    receiving a second image data set representative of a portion of the body including at least the tubular structure and generated by a medical imaging device with the tubular structure in a second position which is different than the first position;
    generating from the first image data set, at each of the viewpoints, a first position image of the body including at least the tubular structure in the first position;
    generating from the second image data set, at each of the viewpoints, a second position image of the body including at least the tubular structure in the second position; and
    simultaneously displaying or the screen display in a dual view mode the corresponding: a) first position images of the body, and b) second position images of the body, at the viewpoints.

2. The method of claim 1 wherein:
    generating the first position mages includes generating, at each of the viewpoints, a first position two dimensional image of the body including at least the tubular structure in the first position;
    generating the second position images includes generating, at each of the viewpoints, a second position two dimensional image of the body including at least the tubular structure in the second position; and
    simultaneously displaying the images includes simultaneously displaying the corresponding: a) first position two dimensional images of the body, and b) second position two dimensional images of the body, at the viewpoints.

3. The method of claim 2 for operating a computer system of the type also including an operator-actuated input device, wherein:
    the method further includes receiving information representative of a sequence of operator-controlled viewpoints along a navigated path in the structure; and
    the step of displaying the images includes updating the displayed images to simultaneously display the corresponding images at the operator-controlled viewpoints along the navigated path.

4. The method of claim 3 wherein the step of receiving information representative of viewpoints along a navigated path includes receiving information representative of viewpoints controlled by an operator through use of a mouse.

5. The method of claim 3 wherein:
    the first and second position two dimensional images are two dimensional axial images of the tubular structure and the surrounding body; and
    the method further includes:
        generating from the first image data set, at each of the viewpoints, first position two dimensional reformatted detailed images of the tubular structure in the first position;
        generating from the second image data set, at each of the viewpoints, second position two dirt tensional reformatted detailed images of the tubular structure in the second position; and
        simultaneously displaying on the screen display during operation in the dual view mode the corresponding: a) first position and second position two dimensional axial images of tubular structure and the surrounding body, and b) the first position and/or second position two dimensional reformatted detailed images of the tubular structure, at the operator-selected viewpoints.

6. The method of claim 5 wherein:
    the corresponding first position and second position two dimensional axial images of the tubular structure and the surrounding body, and the first position and/or second position two dimensional reformatted detailed images of the tubular structure are displayed at a first size level during operation in the dual view mode; and
    the method further includes:
        receiving information representative of an operators desire to operate the system in a single view mode; and
        simultaneously displaying on the screen display during operation in the single view mode at a second enlarged size level either: the corresponding $a_1$) first position two dimensional axial image of the tubular structure and the surrounding body and $a_2$) the first position two dimensional reformatted detailed images of the tubular structure, or the corresponding $b_1$) second position two dimensional axial image of the tubular structure and the surrounding body and $b_2$) the second position two dimensional reformatted detailed images of the tubular structure, at the operator-selected viewpoints.

7. The method of claim 6 and further including:
    generating from the first image data set, at each of the viewpoints, a first position three dimensional detailed image of the tubular structure in the first position;
    generating from the second image data set, at each of the viewpoints, a second position three dimensional detailed image of the tubular structure in the second position; and
    simultaneously displaying on be screen display during operation in the single view mode at a second enlarged size level either: the corresponding $a_1$) first position two dimensional axial image of the tubular structure and the surrounding body, $a_2$) the first position two dimensional reformatted detailed images of the tubular structure and $a_1$) the first position three dimensional detailed image of the tubular structure, or the corresponding $b_1$) second position two dimensional axial image of the tubular structure and the surrounding body, $b_2$) the second position two dimensional reformatted detailed images of the tubular structure and $b_3$) the second position three dimensional detailed image of the tubular structure, at the operator-selected viewpoints.

8. The method of claim 7 wherein:
    generating the first position three dimensional image includes generating a first position three dimensional Virtual Pathology image of the tubular structure; and
    generating the second position three dimensional image includes generating a second position three dimensional Virtual Pathology image of the tubular structure.

9. The method of claim 8 wherein:
    generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

10. The method of claim 5 and further including:

generating from the first image data set, at each of the viewpoints, a first position three dimensional detailed image of the tubular structure in the first position;

generating from the second image data set, at each of the viewpoints, a second position three dimensional detailed image of the tubular structure in the second position; and simultaneously displaying on the screen display during operation in the dual view mode the corresponding: a) first position and second position two dimensional axial images of tubular structure and the surrounding body, b) the first position and/or second position two dimensional reformatted detailed images of the tubular structure and c) the first position and/or second position three dimensional detailed mages of the tubular structure, at the operator-selected viewpoints.

11. The method of claim 10 wherein:

generating the first position three dimensional image includes generating a first position three dimensional Virtual Pathology image of the tubular structure; and generating the second position three dimensional image includes generating a second position three dimensional Virtual Pathology image of the tubular structure.

12. The method of claim 11 wherein:

generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

13. The method of claim 3 and further including:

generating from the first image data set, at each of the viewpoints, a first position three dimensional detailed image of the tubular structure in the first position;

generating from the second image data set, at each of the viewpoints, a second position three dimensional detailed image of the tubular structure in the second position; and simultaneously displaying on the screen display during operation in the dual view mode the corresponding: a) first position and second position two dimensional images of tubular structure, and b) the first position and/or second position three dimensional detailed images of the tubular structure, at the operator-selected viewpoints.

14. The method of claim 13 wherein:

generating the first position three dimensional image includes generating a first position three dimensional Virtual Pathology image of the tubular structure; and generating the second position three dimensional image includes generating a second position three dimensional Virtual Pathology image of the tubular structure.

15. The method of claim 14 wherein:

generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second positions three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

16. The method of claim 3 wherein:

the first and second position two dimensional images are two dimensional axial images of the tubular structure and the surrounding body; and the method further includes:
   generating from the first image data set, at each of the viewpoints, a first position three dimensional detailed image of the tubular structure in the first position;
   generating from the second image data set, at each of the viewpoints, a second position three dimensional detailed image of the tubular structure in the second position; and
   simultaneously displaying on the screen display during operation in the dual view mode the corresponding: a) first position and second position two dimensional axial images of the tubular structure, and b) the first position and/or second position three dimensional detailed images of the tubular structure, at the operator-selected viewpoint.

17. The method of claim 16 wherein:

generating the first position three dimensional image includes generating a first position three dimensional Virtual Pathology image of the tubular structure; and generating the second position three dimensional image includes generating a second position three dimensional Virtual Pathology image of the tubular structure.

18. The method of claim 17 wherein:

generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

19. The method of claim 16 wherein:

the corresponding first posit on and second position two dimensional axial images of the tubular structure and the surrounding body, and the first position and/or second position three dimensional images of the tubular structure are displayed at a first size level during operation in the dual view mode; and the method further includes:

receiving information representative of an operators desire to operate the system in a single view mode; and simultaneously displaying on the screen display during operation in the single view mode at a second enlarged size level either: the corresponding $a_1$) first position to dimensional axial image of the tubular structure and the surrounding body and $a_2$) the first position three dimensional detailed image of the tubular structure, or the corresponding $b_1$) second position two dimensional axial image of the tubular structure and the surrounding body and $b_2$) the second position three dimensional detailed image of the tubular structure, at the operator-selected viewpoints.

20. The method of claim 19 wherein:

generating the first position three dimensional image includes generating a first position three dimensional Virtual Pathology image of the tubular structure; and generating the second position three dimensional image includes generating a second position three dimensional Virtual Pathology image of the tubular structure.

21. The method of claim 20 wherein:

generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

22. The method of claim 3 wherein:

the first and second position two dimensional images are two dimensional reformatted images of the tubular structure; and the method further includes:

generating from the first image data set, at each of the viewpoints, a first position three dimensional detailed image of the tubular structure in the first position;

generating from the second image data set, at each of the viewpoints, a second position three dimensional detailed image of the tubular structure in the second position; and simultaneously displaying on the screen display during operation in the dual view mode the corresponding: a) first position and second position two dimensional re formatted images of tubular structure and b) the first position and/or second position three dimensional detailed images of the tubular structure, at the operator-selected viewpoint.

23. The method of claim 22 wherein:

generating the first position three dimensional image includes generating a first position three dimensional Virtual Pathology image of the tubular structure; and generating the second position three dimensional image includes generating a second position three dimensional Virtual Pathology image of the tubular structure.

24. The method of claim 23 wherein:

generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

25. The method of claim 22 wherein:

the corresponding first position and second position two dimensional reformatted images of the tubular structure and the first position and/or second position three dimensional images of the tubular structure are displayed at a first size level during operation in the dual view mode; and the method further includes:

receiving information representative of an operators desire to operate the system in a single view mode; and simultaneously displaying on the screen display during operation in the single view mode at 1 second enlarged size level either: the corresponding $a_1$) first position two dimensional reformatted image of the tubular structure and $a_2$) the first position three dimensional detailed image of the tubular structure, or the corresponding $b_1$) second position two dimensional reformatted image of the tubular structure and $b_2$) the second position in three dimensional detailed image of the tubular structure, at the operator-selected viewpoints.

26. The method of claim 25 wherein:

generating the first position three dimensional image includes generating a first position three dimensional Virtual Pathology image of the tubular structure; and generating the second position three dimensional image includes generating a second position three dimensional Virtual Pathology image of the tubular structure.

27. The method of claim 26 wherein:

generating the first position three dimensional Virtual Pathology image includes generating a first posit: on three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

28. The method of claim 2 wherein the first position is a supine position and the second position is a prone position.

29. The method of claim 1 wherein:
generating the first position images includes generating, at each of the viewpoints, a first position three dimensional image of the tubular structure in the first position;
generating the second position images includes generating, at each of the viewpoints, a second position three dimensional image of the tubular structure in the second position; and
simultaneously displaying the images includes simultaneously displaying the corresponding: a) first position three dimensional images of the body, and b) second position three dimensional images of the body, at the viewpoints.

30. The method of claim 29 wherein:
generating the first position three dimensional image includes generating a first position three dimensional Virtual Pathology image of the tubular structure; and
generating the second position three dimensional image includes generating a second position three dimensional Virtual Pathology image of the tubular structure.

31. The method of claim 30 wherein:
generating the first position three dimensional Virtual Pathology image includes generating a first position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology; and
generating the second position three dimensional Virtual Pathology image includes generating a second position three dimensional Virtual Pathology image selected from the set including panoramic Virtual Endoscopy, Mercator Virtual Pathology, Cylindrical Virtual Pathology, Planar Virtual Pathology, Axial Planar Virtual Pathology and Curved Cut-Plane Virtual Pathology.

32. A method for operating a digital computer system of the type having a processor and a screen display to provide diagnostic images of a tubular structure of a human body at a series of desired viewpoints longitudinally disposed within the structure, comprising:
receiving a first image data set representative of a portion of the body including at least the tubular structure and generated by a medical imaging device;
receiving information representative of the desired viewpoints within the structure;
generating from the first image data set, a three dimensional Virtual Pathology image simultaneously showing the tubular structure from plurality of points within the structure adjacent the viewpoints; and
displaying on the screen display the three dimensional Virtual Pathology images of the body, at the viewpoints.

33. The method of claim 32 wherein generating the three dimensional Virtual Pathology image of the type simultaneously showing the tubular structure from a plurality of viewpoints includes generating a first position three dimensional Virtual Pathology image selected from the set including Cylindrical Virtual Pathology, and Planar Virtual Pathology.

34. The method of claim 32 and further including:
generating from the first image data set, at each of the viewpoints, two dimensional reformatted images of the tubular structure; and
simultaneously displaying on the screen display the corresponding: a) three dimensional Virtual Pathology images of the tubular structure and b) the two dimensional reformat ed images of the tubular structure, at the viewpoints.

35. The method of claim 32 and further including:
generating from the first image data set, at each of the viewpoints, two dimensional axial images of the tubular structure; and
simultaneously displaying on screen display the corresponding: a) three dimensional Virtual Pathology images of the tubular structure and b) two dimensional axial images of the tubular structure.

36. The method of claim 32 for operating a computer system of the type also including an operator-actuated input device, and wherein:
the step of receiving information representative of desired viewpoints includes receiving information representative of a sequence of operator-selected viewpoints along a navigated path in the structure; and
the step of displaying the images includes updating the displayed images to simultaneously display the three dimensional images at the operator-selected viewpoints along the navigated path.

37. The method of claim 36 wherein the step of receiving information representative of viewpoints along a navigated path includes receiving information representative of viewpoints selected by an operator through use of a mouse.

* * * * *

UNITED STATES PATENT AND TRADEMARK OFFICE
CERTIFICATE OF CORRECTION

PATENT NO. : 6,928,314 B1
DATED : August 9, 2005
INVENTOR(S) : Charles Daniel Johnson et al.

It is certified that error appears in the above-identified patent and that said Letters Patent is hereby corrected as shown below:

Column 23,
Line 23, delete "or" and insert therefor -- on --.
Line 28, delete "mages" and insert therefor -- images --.
Line 65, delete "dirt tensional" and insert therefor -- dimensional --.

Column 24,
Line 40, delete "be" and insert therefor -- the --.
Line 46, delete "$a_1$)" and insert therefor -- $a_3$) --.

Column 25,
Line 26, delete "mages" and insert therefor -- images --.

Column 26,
Line 17, delete "positions" and insert therefor -- position --.

Column 27,
Line 2, delete "posit on" and insert therefor -- position --.
Line 15, delete "to" and insert therefor -- two --.
Line 63, delete "re formatted" and insert therefor -- reformatted --.

Column 28,
Line 36, delete "1" and insert therefor -- a --.
Line 43, delete "in".
Line 55, delete "posit: on" and insert therefor -- position --.

UNITED STATES PATENT AND TRADEMARK OFFICE
CERTIFICATE OF CORRECTION

PATENT NO. : 6,928,314 B1
DATED : August 9, 2005
INVENTOR(S) : Charles Daniel Johnson et al.

It is certified that error appears in the above-identified patent and that said Letters Patent is hereby corrected as shown below:

<u>Column 30,</u>
Line 22, delete "reformat ed" and insert therefor -- reformatted --.
Line 28, insert -- the -- after "on" and before "screen".

Signed and Sealed this

Twenty-fifth Day of October, 2005

JON W. DUDAS
*Director of the United States Patent and Trademark Office*